US008510237B2

(12) United States Patent
Cascaval et al.

(10) Patent No.: US 8,510,237 B2
(45) Date of Patent: Aug. 13, 2013

(54) MACHINE LEARNING METHOD TO IDENTIFY INDEPENDENT TASKS FOR PARALLEL LAYOUT IN WEB BROWSERS

(75) Inventors: Gheorghe C. Cascaval, Santa Clara, CA (US); Adrian L. D. Sampson, Santa Clara, CA (US); Bin Wang, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 13/182,244

(22) Filed: Jul. 13, 2011

(65) Prior Publication Data
US 2012/0239598 A1 Sep. 20, 2012

Related U.S. Application Data

(60) Provisional application No. 61/452,694, filed on Mar. 15, 2011.

(51) Int. Cl.
*G06F 15/18* (2006.01)
*G06N 99/00* (2010.01)

(52) U.S. Cl.
CPC .................................... *G06N 99/005* (2013.01)
USPC .......................................................... 706/12

(58) Field of Classification Search
None
See application file for complete search history.

(56) References Cited

U.S. PATENT DOCUMENTS

2008/0294679 A1* 11/2008 Gatterbauer et al. ......... 707/102
2009/0006944 A1 1/2009 Dang et al.
2009/0248608 A1 10/2009 Ravikumar et al.
2009/0248707 A1 10/2009 Mehta et al.
2010/0223322 A1* 9/2010 Mott et al. .................... 709/203

OTHER PUBLICATIONS

Christopher Grant Jones, et al.; "Parallelizing the web browser"; HotPar'09 Proceedings of the First USENIX Conference on Hot Topics in Parallelism; USENIX Association, Berkeley, CA; 2009.
Leo A. Meyerovich, et al.; "Fast and Parallel Webpage Layout"; WWW'10 Proceedings of the 19th International Conference on World Wide Web; ACM, New York, N.Y.; 2010.
Badea C et al., "Towards Parallelizing the Layout Engine of Firefox", 2nd USENIX Workshop on Hot Topics in Parallelism Internet citation, Jun. 14, 2010, XP002679163, Retrieved from the Internet: URL:http://static.usenix.org/event/hotpar10/tech/full_papers/Badea.pdf [retrieved on Jul. 3, 2012].
International Search Report and Written Opinion—PCT/US2012/028780—ISA/EPO—Sep. 6, 2012.
Mai, H. et al., "A Case for Parallelizing Web Pages", 4th USENIX Workshop on Hot Topics in Parallelism, Berkeley, CA, US, Jun. 7, 2012, Jun. 8, 2012, XP002682330, Retrieved from the Internet: URL: https://www.usenix.org/conference/hotpar12/case-parallelizing-web-pages [retrieved on Aug. 23, 2012].

* cited by examiner

*Primary Examiner* — Alan Chen
(74) *Attorney, Agent, or Firm* — Nicholas A. Cole

(57) ABSTRACT

Methods and devices for accelerating web page rendering include processing web pages and gathering web page element information, performing machine learning analysis on the gathered web page element information to identify patterns in layout independence correlated to web page element information, and training a classifier to predict sub-tree independence based on element information in a web page script. The predicted sub-tree independence may be used to concurrently process portions of a web page to be rendered to reduce the time required to render the page. Sub-trees may be conditionally independent, in which case, the conditionally independent sub-trees may be made independent by speculating data to render the sub-trees independent, or by performing a task to obtain the certain information to render the sub-tree independent.

65 Claims, 14 Drawing Sheets

MACHINE LEARNING METHOD TO IDENTIFY INDEPENDENT TASKS FOR PARALLEL LAYOUT IN WEB BROWSERS

RELATED APPLICATIONS

This application claims the benefit of priority from U.S. Provisional Patent Application No. 61/452,694 entitled "Machine Learning Method to Identify Independent Tasks for Parallel Layout in Web Browsers" that was filed Mar. 15, 2011, the entire contents of which are hereby incorporated by reference.

FIELD OF THE INVENTION

The following description relates generally to computing device communications, and more particularly to apparatus and methods for rendering a web page.

BACKGROUND

A rendering of a page, such as a web page, on a computing device involves generating a document object model (DOM) tree of the page. The DOM tree defines one or more nodes in child-parent relationships, including properties and/or attributes of the respective DOM node and the webpage's style attributes. When a page is launched, the page's .html files are read from the network or from a local disk cache, parsed, and a DOM tree is constructed. Then embedded in/or external cascading style sheets (CSS) may be applied to compute a style for each node in the DOM tree. Once the tree is "styled", a layout algorithm runs to compute the positions and sizes of all DOM elements on the screen. With this information, the browser is able to display the page. These operations may be performed every time a page is loaded, which takes a significant amount of time, thereby leading to a less than satisfactory user experience.

Moreover, this amount of time is exacerbated in a resource-constrained environment, such as a mobile computing device, e.g. a mobile phone, personal digital assistant (PDA) or other relatively small, portable devices having relatively limited processing capability, memory, and/or communications throughput when compared to a non-mobile computing device. Thus, the user experience suffers even more with a mobile computing device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for accelerating webpage rendering includes processing web pages and gathering web page element information. The method performs machine learning analysis on the gathered web page element information to identify patterns in layout independence correlated to web page element information. The method trains a classifier to predict sub-tree independence based on element information in a web page script and the method uses the predicted sub-tree independence to concurrently process portions of a web page to be rendered and renders the web page. In another aspect, the sub-trees may be conditionally independent. In that case, the conditionally independent sub-trees may be made independent by speculating data to render the sub-trees independent, or by performing a task to obtain the certain information to render the sub-tree independent.

In another aspect, a method (which may be implemented in one or more computing devices or in executable instructions stored on a non-transitory storage medium) includes operations of processing a plurality of web pages and gathering web page element information, performing machine learning analysis on the gathered web page element information to identify patterns in layout independence correlated to web page element information, training a classifier to predict sub-tree independence based on element information in a web page script, and using the predicted sub-tree independence to concurrently process portions of a web page to be rendered. In an aspect, the operation of using the predicted sub-tree independence to concurrently process portions of a web page to be rendered may include predicting that a sub-tree is a priori independent based on the web page element information in the web page script, and forming a task out of the a priori independent part of a DOM tree. The aspect method may further include predicting, based on the element information in the web page script that a sub-tree would be conditionally independent if certain information is determined, performing a task to obtain the certain information, and forming a task out of the conditionally independent part of a DOM tree using the obtained certain information. In an aspect performing a task to obtain the certain information may include promptly computing the certain information and/or determining the certain information based on speculation. The aspect method may further include gathering web page element information using an instrumented browser, and gathering web page element information that comprises at least one of web page element layout size, position, CSS style attributes, sub-tree size, HTML tag, parent HTML tag, and web page feature information. The aspect method may further include using the predicted sub-tree independence to determine that a sub-tree of a DOM tree of the web page is not independent and that the sub-tree cannot be concurrently processed and/or using a single web browser to perform the machine learning analysis and to predict sub-tree independence to concurrently process portions of the web page. The aspect method may further include performing machine learning analysis in a first computing device using a first processor, and predicting sub-tree independence to concurrently process portions of the web page in a second different computing device using a second processor. The aspect method may further include updating the classifier by processing a plurality of updated web pages and gathering updated web page element information and performing machine learning analysis on the gathered web page element information to identify additional patterns in layout independence correlated to web page element information. The aspect method may further include training the classifier to predict sub-tree independence based on element information in the web page script at a first time interval and at a second different time interval using the predicted sub-tree independence to concurrently process portions of the web page to be rendered.

In a further aspect, the foregoing methods may be implemented within a single computing device in which processing a plurality of web pages and gathering web page element information is accomplished in an instrumented browser operating on the single computing device, and performing machine learning analysis on the gathered web page element information to identify patterns in layout independence correlated to web page element information is accomplished in the same computing device.

In a further aspect, the foregoing methods may be implemented in a network of computing devices and a server in which processing a plurality of web pages and gathering web page element information includes processing a plurality of web pages and gathering web page element information in the plurality of computing devices, transmitting to the server from each of the plurality of computing devices the gathered web page information, receiving and aggregating in the server the web page information transmitted by the plurality of computing devices to generate aggregated web page element information, transmitting aggregated web page element information to at least one of the plurality of computing devices, and receiving in the at least one of the plurality of computing devices the transmitting aggregated web page element information. Further in this aspect performing machine learning analysis on the gathered web page element information to identify patterns in layout independence correlated to web page element information is accomplished in the at least one of the plurality of computing devices on the received aggregated web page element information, and training a classifier to predict sub-tree independence based on element information in a web page script comprises training a classifier operating in the at least one of the plurality of computing devices to predict sub-tree independence based on machine learning analysis performed on the received aggregated web page element information.

In a further aspect, the foregoing methods may be implemented in a network of computing devices and a server in which processing a plurality of web pages and gathering web page element information may include processing a plurality of web pages and gathering web page element information in a plurality of computing devices, transmitting to a server from each of the plurality of computing devices (e.g., via the Internet) the gathered web page information, and receiving in the server the web page information transmitted by the plurality of computing devices to generate aggregated web page element information. In this aspect, performing machine learning analysis on the gathered web page element information to identify patterns in layout independence correlated to web page element information may be accomplished in the server on the received web page information transmitted by the plurality of computing devices to identify patterns in layout independence, and the method may further include transmitting from the server to at least one of the plurality of computing devices (e.g., via the Internet) the identified patterns in layout independence, and receiving in the at least one of the plurality of computing devices the identified patterns in layout independence. Further in this aspect, training a classifier to predict sub-tree independence based on element information in a web page script may include training a classifier operating in the at least one of the plurality of computing devices to predict sub-tree independence based on the received identified patterns in layout independence.

In a further aspect, the foregoing methods may further include processing a plurality of web pages specific to a predetermined browser and gathering web page element information specific to web pages rendered on the predetermined browser, and performing machine learning analysis on the gathered web page element information to identify patterns in layout independence correlated to web page element information, in which the patterns correspond to the web pages rendered on the predetermined browser, training the classifier to predict sub-tree independence based on element information in the web page script, and using the predicted sub-tree independence to concurrently process portions of a web page to be rendered, wherein the web page is rendered using the predetermined browser. In a further aspect, the foregoing methods may further include predicting sub-tree independence in the classifier based on the element information in the web page script, in which the classifier provides sub-tree independence data to a scheduling algorithm. In a further aspect, the foregoing methods may further include the scheduling algorithm using the predicted sub-tree independence to concurrently process portions of the web page, and performing machine learning analysis on the gathered web page element information to identify patterns in layout independence correlated to presentation semantics in a predetermined style sheet language coding. In a further aspect, the foregoing methods may further include performing machine learning analysis on the gathered web page element information to identify patterns in layout independence correlated to web page element information in CSS coding. In a further aspect, the foregoing methods may further include using the predicted sub-tree independence to render a first independent sub-tree of a DOM tree before rendering a second dependent sub-tree of the DOM tree. In a further aspect, the foregoing methods may further include training the classifier on a dataset including a node feature as an input and layout independence as an output. In a further aspect, the foregoing methods may further include continuously processing a plurality of web pages from the Internet and gathering web page element information, continuously performing machine learning analysis on the gathered web page element information to identify patterns in layout independence correlated to web page element information, and updating the classifier to predict sub-tree independence based on element information in the web page script and the identified patterns.

In a further aspect, the foregoing methods may further include processing a first set of web pages and gathering web page element information associated with the first set of web pages and performing machine learning analysis on the gathered web page element information to identify a first set of patterns, using the first set of patterns associated with the predicted sub-tree independence of the first set of web pages to concurrently process portions to be rendered, and continuously updating the first set of patterns in a dynamic manner by gathering additional web page element information and performing machine analysis to identify additional patterns to supplement the first set of patterns in a continuous manner. This aspect may further include processing a second set of web pages and gathering web page element information to identify a second set of patterns and using the second set of patterns to update the first set of patterns.

In a further aspect, the foregoing methods may further include performing machine learning analysis on the gathered web page element information to identify patterns in layout independence correlated to web page element information in HTML coding, in which the HTML coding includes a first sub-tree of the DOM tree that indicates a parallel processing capability, the HTML coding also includes a second sub-tree that is silent as to the parallel processing capability of the second sub-tree, and the classifier predicts sub-tree independence of the second sub-tree of web page elements based on element information in the web page script.

Another aspect relates to a computing device for accelerating a web page rendering using the foregoing methods. The computing device includes a memory and a processor coupled to the memory. The processor may be configured with processor-executable instructions to perform operations including processing a plurality of web pages and gathering web page element information and performing machine learning analysis on the gathered web page element information to identify patterns in layout independence correlated to web page element information. A classifier may be trained to predict sub-tree independence based on web page element information in a web page script. The predicted sub-tree independence may be used to concurrently process portions of a web page to be rendered.

Yet another aspect relates to a computing device include means for accomplishing operations of the foregoing methods, including means for processing a plurality of web pages, means for gathering web page element information, and means for performing machine learning analysis on the gathered web page element information to identify patterns in layout independence. The patterns may be correlated to the web page element information. The computing device also has means for training a classifier to predict sub-tree independence based on web page element information in a web page script and means for using the predicted sub-tree independence to concurrently process portions of a web page to be rendered.

Still further aspects relate to non-transitory computer readable storage media having stored thereon processor-executable instructions configured to cause a processor of a computing device to perform operations of the foregoing methods.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention not to limit the disclosed aspects.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "computing device" and "mobile computing device" refer to any one or all of cellular telephones, personal television receivers, personal data assistants (PDAs), palm-top computers, notebook computers, personal computers, wireless electronic mail receivers and cellular telephone receivers (e.g., the Blackberry® and Treo® devices), multimedia Internet enabled cellular telephones (e.g., the Blackberry Storm®), and similar electronic devices that include a programmable processor, memory, and a display.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Figure 1A:
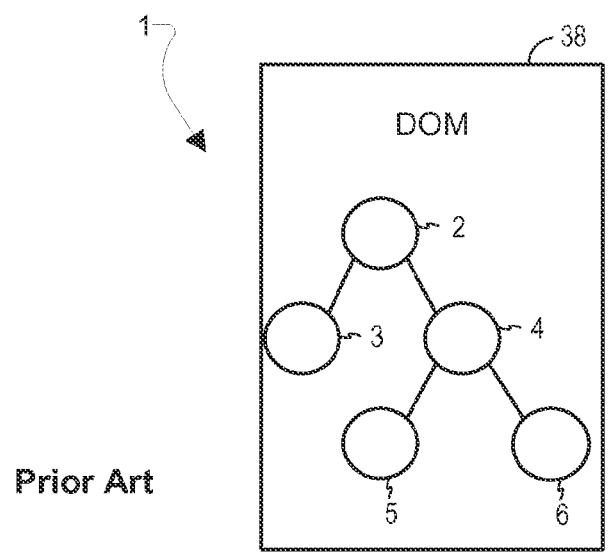
FIGS. 1A and 1B are schematic illustrations of DOM trees.

The described aspects relate to fetching and rendering a displayed page of information, such as a web page, having web resources and data items. In addition, the described aspects provide a virtual effect of transitioning between web pages, e.g., providing links for a user to move forward and backward between web pages. The web page is rendered according to a corresponding Document Object Model (DOM), referred to herein as a DOM tree, which is generated as part of rendering a web page to identify the components, relative structure, relationships, and behavior of the respective components that define the page. The DOM tree is a cross-platform and language-independent convention for representing and interacting with objects in HTML, XHTML and XML documents. An example of a DOM tree 1 is illustrated in FIG. 1A. A DOM tree structure 1 is defined by a plurality of nodes, such as nodes 2, 3, 4, 5, and 6, and which further represents different instances of a web page. A first sub-tree as defined by nodes 4 and 5 and a second sub-tree as defined by nodes 4 and 6 are shown.

Figure 1B:
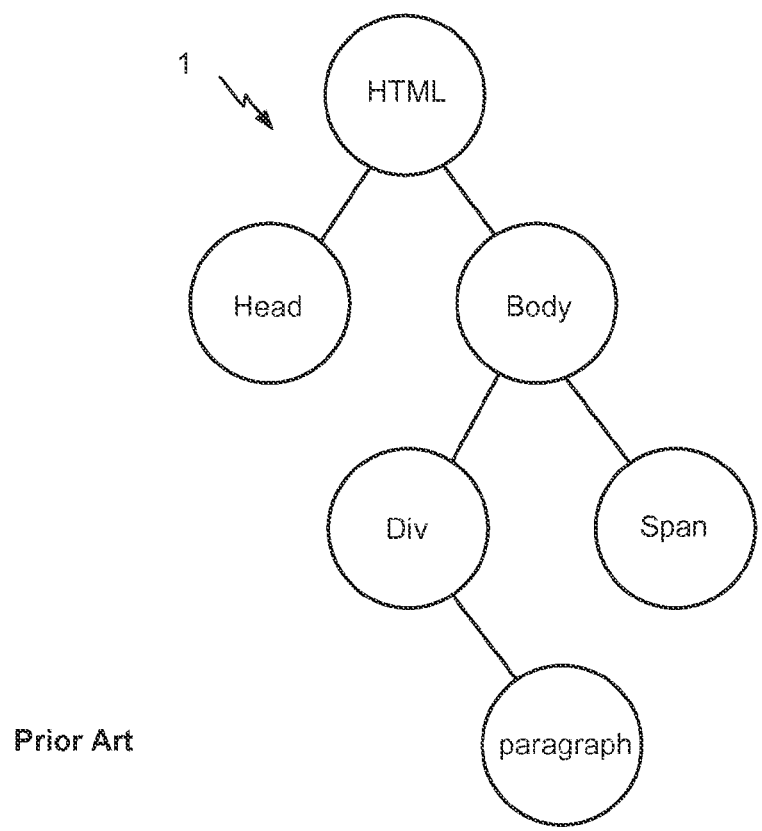

FIG. 1B provides another illustration of a DOM tree 1 illustrating how nodes may correspond to different elements to be displayed in a web page defined by an HTML script. FIG. 1B illustrates a sample portion of a DOM tree 1 generated by a browser parsing HTML code for a requested web page. As illustrated in FIG. 1B, when parsing HTML code, a browser may create a DOM element and/or node for each heading in the process of rendering a web page. Web page element information may include textual information, non-textual information, static images (GIF images, JPEG images, PNG, SVG, Flash), animated images (Animated GIF, SVG, Flash, Shockwave, Java applets), audio data (MP3, OGG, etc.), video data (WMV, RM, FLV, MPG, MOV data), interactive text, buttons, interactive illustrations, hyperlinks, forms, internal or hidden data (comments, linked files, metadata), diagram information, style information, scripts and other data. In the illustrated example, the HTML code contains a header section (e.g., <HEAD> . . . </HEAD>) and a body section (e.g., <BODY> . . . </BODY>). The body section contains at least one Div section and at least on Span section, as illustrated by the Div and Span nodes in the DOM tree 1. Each of the Div and Span nodes may also contain sub-sections, as illustrated by the paragraph section of the Div section. In the process of accomplishing the calculations for rendering the page, the DOM tree elements (e.g., Body, Div, Paragraph, etc.) may be traversed to compute the properties and characteristics of the various page components. For example, for computing the layout of a requested page, the DOM tree may be traversed to extract the absolute values for the heights, widths, and positions (e.g., h=50, w=50, x=500, y=10) of each element, which are typically dependent on run-time and environmental factors (e.g., window size) and cannot be determined ahead of time.

The DOM tree defines relationships between page contents (data) elements, style and formatting information, and positioning information that provide a simple and efficient mechanism to identify and construct the page. The sub-trees of nodes may be independent, dependent or conditionally independent in the event that certain information may be either speculated or calculated, or inferred to render the sub-tree independent.

In a web browser, a layout computation will determine a position of each page element based on the HTML specification, the web element's relationship to other web elements, and cascading style sheet (CSS) rules. Cascading Style Sheets (CSS) is a style sheet language that is used to describe one or more presentation semantics of a document written in a markup language. CSS can be used to style web pages written in HTML and XHTML and may be applied an XML document. The layout computation to determine the position of the web page elements represents 15-20% of the time to load a web page based on some current estimates. Users prefer a fast load time for web pages. This incremental increase in the amount of time required to load and display a web page may lead users to disfavor such a browsing experience. This is particularly true with browsing with mobile communication devices which may have limited processing power and memory for caching previously rendered pages.

A computational layout of a web page may be sped up by concurrently processing portions of a web page through parallelization. By processing the independent sub-trees concurrently with other portions of the DOM tree, the entire DOM tree may be processed faster and the web page rendered quicker. However, to accomplish this concurrent processing, independent sections of a DOM tree must be identified. Web elements of the DOM tree may be addressed and manipulated within the syntax of the programming language in use. Sections of a DOM tree may be clumped into a first section (a first sub-tree of the DOM tree) for which the layout computation may proceed concurrently, and into other sections (second sub-tree of the DOM tree) in which the layout computation cannot proceed concurrently. Determining whether a DOM sub-tree is independent or dependent is an important step in identifying portions of a page defining script that can be processed concurrently.

The various aspects make use of one or more machine learning algorithms to identify such independent sub-trees of the DOM tree. Once an independent sub-tree is identified, that independent sub-tree may be processed concurrently to speed the loading of the web page. Likewise, other sub-trees may be dependent and cannot be processed concurrently. Other sub-trees may be made independent based on other factors. To increase concurrent processing, a processor implementing an aspect method may rely on speculation. Such speculation may proactively remove dependences between strongly connected components of some sub-trees. This would thus make the sub-trees independent for processing purposes, and thus capable of concurrent processing to speed the loading of the web page. In another aspect, a sub-tree may be analyzed to determine that the sub-tree may be conditionally independent based on certain obtained information.

The page layout step of HTML processing assigns positions and dimensions to visible page elements based on the DOM tree and the CSS style for each DOM node. A web browser traverses a DOM tree of the display elements and lays out each element based on the calculated size and position of the element's children. In some cases, the web elements' layout may also depend on other non-child elements, such as siblings and parents. In others, the layout for a given element only depends on the layout for the element's children. In cases where the layout depends only on children, an opportunity for parallel processing exists. A layout routine for such an independent element's sub-tree may be executed in parallel with the layout of a remainder of the DOM tree.

The HTML standard defines certain cases in which web elements have an independent layout. For example, floating and absolutely-positioned web elements may have an independent layout and may be processed in an independent manner. However, in other cases, an independence sub-tree or layout may be not evident from the DOM tree or web elements. Sometimes, certain web elements will not specify such an independent layout.

The various aspects identify web elements whose layout may be independent in order to speculatively execute those web elements in parallel with a remainder of the DOM tree. The various aspects include a parallel layout computation that may be task-based. The layout of different parts of the DOM tree may be computed concurrently. Certain sub-trees of the DOM tree will be independent based on the CSS and HTML specification.

To identify more independent sub-trees for concurrent processing, the various aspects applies a machine learning algorithm or algorithms to partition the DOM tree based on layout information flows from parent to children nodes and to find strongly connected components. A web browser may be instrumented to report, after the layout step, each element's layout required size and position information from other non-child nodes. The instrumented browser may also output a variety of information ("features") about each node (e.g., its CSS style attributes, the size of the sub-tree, the HTML tag, the parent's HTML tag, etc.). This feature and layout-independence data may be collected for a large body of existing web pages to which the machine learning algorithm(s) may be applied in order to recognize patterns that can be used to identify independent sub-trees for concurrent processing.

The collection of webpage data and the application of the machine learning algorithms to such data to identify patterns may be accomplished within the computing device or within a centralized computing device, such as a server to which web browsers report their information. In the aspects in which the webpage data is captured and processed locally, the use of machine learning algorithms may enable the computing device to more efficiently render the types of webpages typically accessed by a user. Thus over time, the system is able to learn patterns from the user's Internet accessing habits, and use that information to train the browser to enable greater concurrent processing of webpages when they are accessed.

In the aspects in which the webpage data is centrally collected and processed, such as in a server coupled to the Internet, webpage rendering data from a large number of users can be analyzed in order to load recognize patterns that are applicable across a wide spectrum of the Internet. Such machine learned of patterns may reflect current webpage development practices by developers. Such community-based pattern data may enable the development of training data that can be used to train Web browsers to recognize portions of webpage script that can be concurrently processed that is applicable to a wide variety of webpages, not just those accessed by particular users.

In order to make use of the recognized patterns and training data obtained by applying machine learning algorithms to webpage rendering information, a browser may be configured with a classifier that can be will be trained on a dataset of such patterns. In this aspect, the training data generated by the machine learning algorithms and applied to a trainable classifier may include node features as input and provide as output layout independence conclusions, such as sub-trees that are independent, sub-trees that may be conditionally independent, and sub-trees which are likely independent for speculative processing. During the page layout process, the trained classifier may access the machine learned patterns and use such information to predict for a new DOM tree (i.e., a new page being rendered) whether each sub-tree of the DOM tree may be laid out independently, and thus be processed concurrently, or whether the sub-tree is a dependent sub-tree that cannot be laid out independently.

In one aspect, a trained classifier may precisely predict that a sub-tree is a priori independent. This may be based on the web page element information in the web page script. Once determined that the sub-tree is a priori independent, the algorithm forms a task out of the independent part of the DOM tree.

In another aspect, a trained classifier may predict that a sub-tree is independent if certain information may be inferred, thereby removing a parent-child dependence. Once the certain information is inferred, the sub-tree will be treated as an independent sub-tree and may be concurrently processed during web page rendering.

In another aspect, a trained classifier may predict that a sub-tree is independent if certain information may be obtained by computation. The algorithm may schedule a task to quickly compute the information that breaks the dependence. Once the task is completed, and the required information is obtained, the sub-tree may be concurrently processed and the web page rendered.

In another aspect, a trained classifier may predict that a sub-tree is independent if certain information may be predicted. The system may schedule the predicted independent sub-tree speculatively and predict the information needed by the DOM sub-tree to enable concurrent processing. The speculative layout tasks monitor for dependences on non-child nodes, and if any occur and the dependent information is not correctly predicted, the task may be restarted with the correct information.

Optionally, in some aspects, the machine learning algorithm may be integrated into a web browser, or alternatively, the machine learning algorithm may be implemented in a processing module separate from the web browser. In another aspect, the machine learning algorithm may be trained on dependencies on pages that are specific to the web browser, or alternatively, the machine learning algorithm may be trained on dependencies from web pages accessed from the Internet. The machine learning algorithm may observe patterns in dependencies and classify dependencies or Dom tree patterns associated with or indicating a likely independent sub-tree that may be processed concurrently. In this aspect, the machine learning algorithm may be implemented "off-line" or "on-line" and provide a first set of patterns to the web browser. The machine learning algorithm may operate within the integrated browser or may provide a first set of patterns from a remote entity that may be periodically updated.

The patterns recognized by the machine learning algorithm may be in the form of a set of patterns in the HTML code including layout attributes, CSS attributes and patterns observed in the DOM tree. It should be appreciated that the patterns recognized in webpage code may be from a web page style that may be observed in the future and that may be not well defined at the present. The machine learning algorithm may collect the patterns and format them so that they can be provided to a scheduling algorithm within a web browser. Such a scheduling algorithm within the web browser may work with a trained classifier to take advantage of recognized patterns to concurrently process portions of a web page that correspond to predicted independent sub-trees.

The use of the predicted sub-tree independence to concurrently process portions of a web page and rendering the page using the sub-tree independence using machine learning analysis may increase the speed of rendering an instance of a page. This increase in speed of rendering a page may improve a user experience when transitioning from one page to another page since the browser does not have to wait for a full DOM tree to be processed since portions of the DOM tree may be processed faster in parallel.

Figure 2:
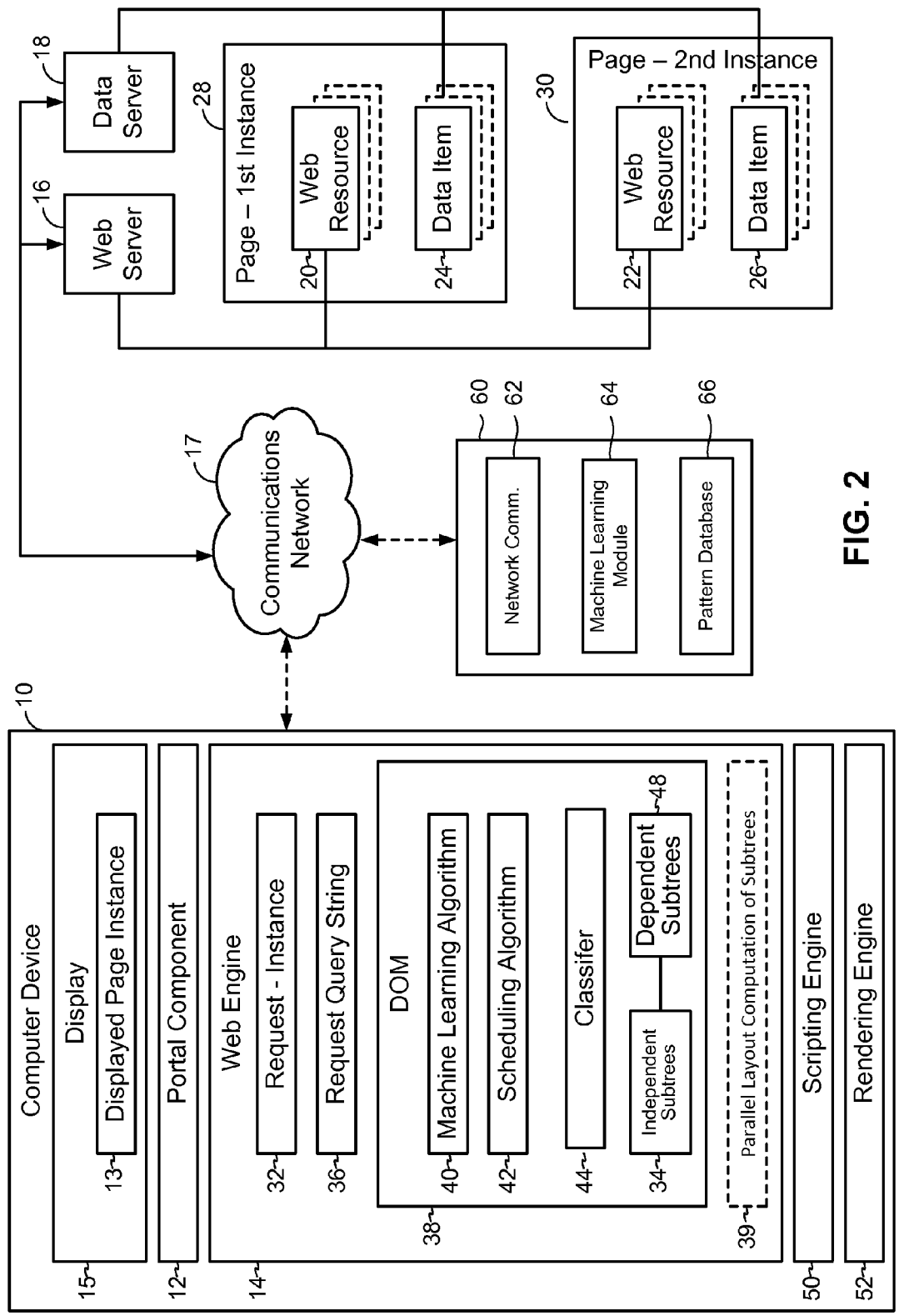
FIG. 2 is a functional block diagram of a communication system for receiving and rendering webpages according to an aspect.

FIG. 2 illustrates a communication system that enables a computer 10 to render webpages hosted on Web servers 16, 18 and communicated via a communication network 17, such as the Internet. As mentioned above, the aspects of a machine learning algorithm may be implemented either on the local computing device 10 or on a remote server 60 coupled to the computing device 10 via a communication network 17. For ease of description, FIG. 2 illustrates both aspects, showing the machine learning algorithm module included on both the computing device 10 and remote server 60.

Referring to the computing device 10 in FIG. 2, in an aspect in which the machine learning algorithm is implemented as a module within a processor of the computing device 10, the computing device 10 may be configured with a portal component 12 that interacts with a web engine module 14 running on a processor with computing device to enable presentation of one or more instances of a page 13, such as a web page, on a display 15. For example, the displayed page 13 may be obtained via a communications network 17 from a web server 16 and/or a data server 18. The web server 16 and data server 18, which may be separate or integrated components, respectively store web resources 20 and 22 and data items 24 and 26 that respectively define a first page instance 28 and a second page instance 30. For example, web resources 20 and 22 may include anything needed to construct a static portion of the page, such as an empty page template that may be filled with data, while data items 24 and 26 may include any content used to fill the page, such as one or more dynamic portions of the page. As such, all or some portion of web resources 20 and 22 may be common to both a first page instance 28 and a second page instance 30, while all or some portion of data items 24 and 26 may be unique to the respective page instances.

In the computing device 10, the portal component 12 may communicate a received request 32, such as based on a user input or a launching of the portal component 12, which identifies a requested instance of a page to the web engine 14. For example, the received request 32 may include a first portion that defines a web resource, such as a universal resource locator (URL), and a second portion that defines specific data to fetch, such as a query string 36. The web to give 14 or portal component 12 transmit the request via a communications network to the Web server 16 and/or data server 18, which return the requested page components via the communication network. The transmitted page components are then received and processed by the web engine component 14 within the computing device 10. During the rendering of a received page, the web engine 14 generates a document object model (DOM) 38 for the page. As discussed above, the DOM 38 defines a tree or hierarchy of one or more nodes in child-parent relationship, including properties and/or attributes of the respective DOM node and its style attributes, which enables rendering of the page.

In aspects in which the web engine 14 includes a machine learning algorithm module 40, that module receives from the web engine 14 data associated with a number of processed web pages to gather web page element information. The machine learning algorithm 40 performs machine learning analysis on the gathered web page element information to identify patterns in layout independence correlated to the web page element information. The machine learning algorithm 40 may take advantage of examples of data from the Internet, or received from the communication network 17 to capture characteristics of interest or underlying probability distributions of independent sub-trees in web pages based on the context. The machine learning algorithm 40 forms relations between observed variables and automatically learns to recognize complex patterns and make generalized patterns from the given gathered web pages so as to be able to produce a useful output. The types of patterns recognized or generated by the machine learning algorithm module 40 enables the web engine 14 to identify or predict from received web page script the DOM 38 those sub-tree components 34 that are independent and the DOM sub-tree components 48 that are not independent based on a number of machine learned examples. The types of recognized or generated patterns may also enable the web engine 14 to identify or predict from received web page script the DOM 38 those sub-trees that are conditionally independent. The types of recognized or generated patterns may also enable the web engine 14 to identify or predict from received web page script the DOM 38 those sub-trees that are a priori independent based on the web page element information in the web page script. In one aspect, the gathered web page elements may be specific to a particular browser or specific to a particular user. In another aspect, the gathered web page elements may be derived from the Internet to form a set of static patterns that may be updated periodically. In another aspect, the machine learning algorithm 40 may be separate from the web engine 14 and the computing device 10. In another aspect, the machine learning algorithm 40 may be integrated within the web engine 14, a browser, web server 16, data server 18, web resource 20 or 22 or the computing device 10.

In another aspect, the machine learning algorithm module may be implemented within a remote computing device, such as a remote server 60 coupled to the communications network 17, so that it may receive webpage rendering data from a large number of computing devices. In such an aspect, the server may include a network communication module 62 for communicating without the computing device 10 via the communications network, including receiving webpage rendering information from such computing devices. The server may also be configured with a machine learning module 64 that is configured to implement a machine learning algorithm to process received webpage rendering information in order to recognize complex patterns and make generalized patterns from the given gathered webpage rendering information. As discussed above, such patterns may be related to predicting sub-tree structures that are independent, conditionally independent or speculatively independent based upon the pattern in the webpage script. Such patterns may be stored in a pattern database 66 in format that is usable by computing device web engines. The machine learning module 64 may be configured to generate pattern data for all webpage information received from all computing devices in order to generate a single pattern data set. Alternatively, the machine learning module 64 may be configured to generate pattern data for selected types of webpages or even specific URLs. The server 60 may be further configured to communicate such generated pattern data to computing devices 10 via the communications network 17 (e.g., via the network communication module 62) to enable the web engine 14 within computing devices to render pages more efficiently. Such pattern data may be transmitted directly to computing devices (e.g. computing devices that have registered for or subscribe to the pattern data service) via the communications network 17. Alternatively, such pattern data may be provided to companies that host webpages, such as by communicating sending the information to web server 16 and/or data servers 18 to view the communications network 17. This aspect enables companies hosting webpages to provide pattern information for their webpages, such as by delivering the pattern data as metadata, in order to enable Web browsers to more efficiently render their webpages.

Returning to the computing device 10, the web engine module 14 may include a scheduling algorithm module 42. The scheduling algorithm module 42 may enable threads, processes or data flows to be given access to system resources to load balance a system effectively. Alternatively, the scheduling algorithm 42 may achieve a target quality of service. The scheduling algorithm 42 preferably permits the web engine 14 to execute more than one process at a time and to transmit multiple flows of data simultaneously to the scripting engine 50 and the rendering engine 52 to render a web page. The scheduling algorithm 42 preferably uses predicted sub-tree independence to concurrently process portions of the web page to be rendered.

The web engine module 14 may also include a classifier module 44. The classifier module 44 may be trained to predict which of the sub-trees 34 of the DOM 38 are independent and which of the sub-trees 48 of the DOM 38 are dependent. The classifier module 44 may compare element information in a web page script to patterns for pattern data provided by the machine learning algorithm to make predictions regarding portions of the dog tray that can be concurrently process, either conditionally or unconditionally. The classifier module 44 may include a number of program instructions to describe a set of instances that have common behavioral and structural features from the DOM 38.

As discussed above, the DOM 38 has a tree structure that includes a number of sub-trace. The classifier module 44 may will examine the DOM 38 and web page element information in order to classify a number of the sub-trees as being independent 34 and a number as being dependent 48. Depending upon the structure of the DOM 38, the classifier module 44 may predict that a sub-tree 34 is a priori independent, in which case the scripting or rendering engine 50 or 52 may form a task out of the a priori independent part of a DOM tree 38.

In some cases, the classifier module 44 may identify a sub-tree 48 as being conditionally independent. In such cases, the classifier 44 may predict based on the element information in the web page script that is a sub-tree would be independent if certain information may be determined. This determination enables the web engine 14 2 perform a task to obtain the certain information necessary to render the sub-tree independent. By the web engine 14 promptly performing a computation to render the certain information, the conditional independent part of the DOM 38 may be processed as an independent sub-tree 34, and thus may be processed concurrently.

In some cases, the classifier module 44 may identify a sub-tree 48 as being speculatively independent, in which case the web engine 14 may speculate to determine information would render the sub-tree independent. The web engine 14 may then render this sub-tree has independent that can be concurrently processed. The speculation may be accomplished by a speculation algorithm module 42, which may be part of the software making up the web engine 14.

The web engine 14 may also include a parallel computation layout engine module 39 that assists the rendering engine module 52 and provides for a parallel computation of independent sub-trees 34 with dependent sub-trees 48 to concurrently process portions of the DOM tree 38 while rendering the web page 52. In another aspect, the computation engine module 39 may also reference an index or the like to assist with rendering the web page. Preferably, the computational engine module 39 uses the web elements of the DOM 38 to address and manipulate the web elements within the syntax of the programming language in use. In an aspect, the parallel layout computation engine module 39 may be incorporated within the rendering engine 52.

The various aspects of leverage that the patterns recognized by the machine learning algorithm to enable faster rendering of web pages. This may be accomplished by the web engine 14 processing clumps of data in parallel without waiting for an entire DOM structure to be processed. This may enable the web engine 14 to process a first portion of the DOM 38 at the same time as a second portion of the DOM 38 corresponding to the requested instance of the page 32.

Additionally, computing device 10 may be configured with a scripting engine module 50 operable to perform scripting functionality. For example, the web engine module 14 may interact with the scripting engine 50 to load scripts corresponding to the page, which the scripting engine 50 executes to register the corresponding script functions. In response to an on load event received from web engine 14, the scripting engine 50 may further run the page script and generate send calls to initiate the fetching of corresponding dynamic data for the instance of the web page. Further, after receiving the dynamic data, the scripting engine 50 may apply the data, for example via a DOM application program interface (API), and write the data to the corresponding DOM.

Additionally, the computing device 10 may include a rendering engine 52 that interacts with the web engine 14. For example, in response to a request from the web engine 14, the rendering engine 52 may paint one or more parts of a respective page that correspond to one or more independent DOM sub-tree portions 34, and/or that correspond to one or more dependent DOM sub-tree portions 48 for the respective instance of the page. Further, the rendering engine 52 may interact with a display 15 to present the painted portions of the page, thereby presenting a respective instance of the page.

Figure 3:
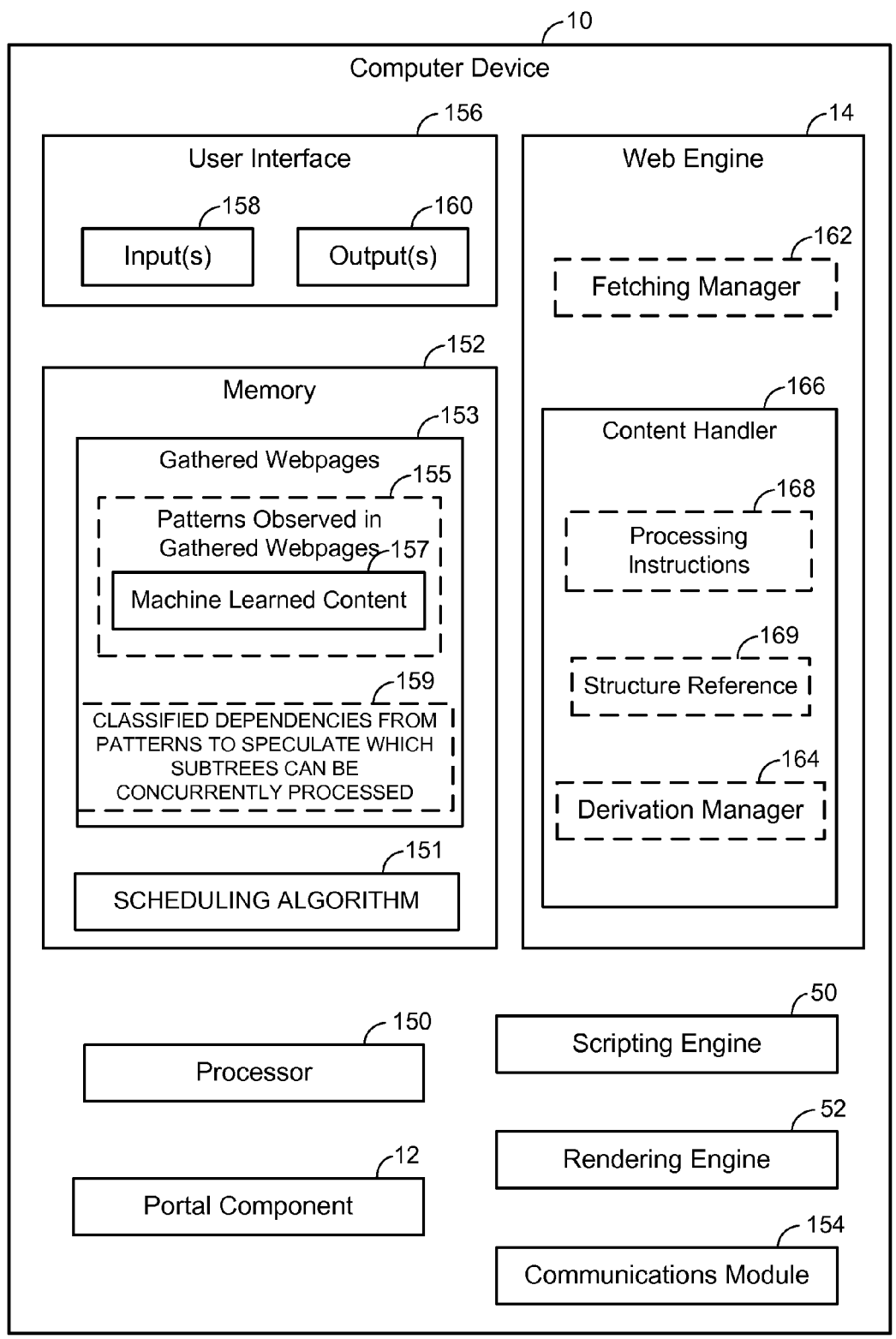
FIG. 3 is a functional block diagram of a computing device suitable for use with an aspect.

Thus, by performing machine learning analysis on the gathered web page element information using a machine learning algorithm module 40, 64 to identify patterns in layout independence correlated to web page element information, and by training a classifier to predict sub-tree independence based on element information in a web page script, the described aspects may speed up the rendering of webpages Functional modules of a computing device 10, such as a mobile or cellular phone, are illustrated in FIG. 3. Such functional modules may include a processor 150 that executes processor-executable instructions to accomplish the processing functions associated with one or more of modules and functions described herein. The processor 150 may include a single or multiple set of processors or multi-core processors, and may be implemented as an integrated processing system and/or a distributed processing system.

Computer device 10 may further include a memory 152, such as for storing local versions of applications being executed by processor 150, and/or for long term storage of data, instructions, and/or applications not currently being executed or utilized by processor 150. In an aspect, the memory 152 may store a number of web pages 153. The gathered web pages 153 may be processed and stored in a memory 152. Preferably, the gathered web pages 153 may be from the Internet to observe patterns in web content within the gathered web pages 153. In another aspect, the gathered web pages 153 may be a subset of pages from the Internet, or specific to a number of pages viewed in a particular web browser, or specific to another parameter to obtain a focused search of patterns. In one aspect, memory 152 may further include patterns observed in gathered web pages 155 that are derived from the machine learning analysis and learned content 157. Upon receipt of the patterns 155 that are derived from gathered web pages 153, the computing device 10 may further store the patterns 155 in the memory 152. As described above, this processing may involve classifying dependencies from the patterns 155 to enable the web engine to identify the sub-trees of the DOM tree 38 that are independent, conditionally independent, and dependent (i.e., cannot be concurrently processed).

As discussed above, the computing device 10 may include a communications module 154 that manages establishing and maintaining communications with one or more entities utilizing hardware, software, and services as described herein. The communications module 154 may also transmit data between functional modules and components within the computing device 10, as well as between the computing device 10 and external devices, such as devices located across a communications network 17 and/or devices serially or locally connected to computing device 10. For example, the communications module 154 may include one or more buses, and may further include interfaces, one or more transmitters or transmit chain components and one or more receivers or receive chain components operable for interfacing with external devices. For example, such transmitter and receivers may enable wired or wireless communications according to one or more technologies or protocols.

The computing device 10 may additionally include a user interface component 156 operable to receive inputs 158 from a user of the computing device 10, and further be operable to generate outputs 160 for presentation to the user. The user interface component 156 may include one or more input devices, including but not limited to a keyboard, a number pad, a mouse, a touch-sensitive display, a navigation key, a function key, a microphone, a voice recognition component, image capture device, any other mechanism capable of receiving an input from a user, or any combination thereof. Further, the user interface component 156 may include one or more output devices, including but not limited to a display, a speaker, a haptic feedback mechanism, a touch screen, a printer, any other mechanism capable of presenting an output to a user, or any combination thereof.

Additionally, as noted above, the computing device 10 may include a portal component module 12, which may be one or any combination of a web browser, a widget or a mobile widget, or a web application. The portal component module 12 may be operable to interface with a user of the computing device 10, as well as with other components of the computing device 10, to enable rending of a web page.

Optionally, in some aspects, the web engine 14 may include a fetch manager 162 configured to manage timing and performance of fetch operations. For example, the fetch manager 162 may enable pre-fetching of content for the page having a link that was just clicked from a referring page, where the referring page includes the URLs to perform the pre-fetching.

For example, the fetch manager 162 may execute a pre-fetch discovery call in the JavaScript® of the referring page. As another example, the fetch manager 162 may tag or order URLs to fetch on a page so these tags or URLs may be processed in page rendering prior to receiving a request for the respective page. For example, the fetch manager 162 may include algorithms or functions to determine relationships between pages, e.g. adjacent pages in a list, adjacent pages in a hierarchy, etc., in order to determine what to pre-fetch and when to pre-fetch. In other aspects, the described apparatus and methods may include in the HTML head of a current page a manifest of the known URLs, which will be analyzed by the will fetch manager 162 for pre-fetching. In another aspect, the described apparatus and methods may include in the HTML head of a referring page a structured manifest of the URLs for each reachable page, which will be analyzed by the fetch manager 162 to execute pre-fetching for each reachable page.

The computing device 10 web engine 14 may further include a content handler module 166 to assist in processing of content. In one aspect, the content handler module 166 allows the computing device 102 to determine whether to generate machine learned content 157. Further, the content handler module 166 may receive processing instructions 168 from a communications network 17. In such an aspect, the communications network may provide processing instructions 168 along with content to be stored at computing device 102. For example, processing instructions 168 may be transmitted with an image and may provide instructions for remapping the image pixels. As such, the size of the content that is transferred with the processing instructions may be small. Once the small-sized raw content and processing instructions are received by the computing device 102, the processing instructions 168 facilitate expanding out the content into a richer image or a more rich set of content. The content handler module 166 may further include a structure reference 169 to assist in the processing of received content.

Optionally, in some aspects, the content handler module 166 may include a derivation manager 164 to pre-derive a DOM or portions of a DOM prior to a request for the respective instance of the page. The derivation manager 164 may include algorithms or functions that provide a layer in managing the derivation of web pages into the DOM when that page is needed. The derivation manager 164 may enable such derivation to occur in a smart way, likely not when first downloaded via directive from the manifest. For example, the algorithms or functions of derivation manager 164 may determine relationships between pages (e.g. adjacent pages in a list, adjacent pages in a hierarchy, etc.) in order to determine what to pre-derive and when to pre-derive one or more pages. The derivation manager 164 may infer that a certain portion of the content does not need to be processed since it already has seen an identical piece. It should be noted that the fetch manager 162 and the derivation manager 164 may be combined in the same web engine 14 or content handler module 166 to improve the performance for first runs of a page in a session.

A scripting engine 50, such as a JavaScript engine, manages the registering of script functions and the running of script of a given instance of a page. A rendering engine 52 generates or paints all or portions of a given instance of a page, and communicates the results to a component of a user interface 156, such as a displayed page instance 13 presented on the display 15 (shown in FIG. 2).

Figure 4:
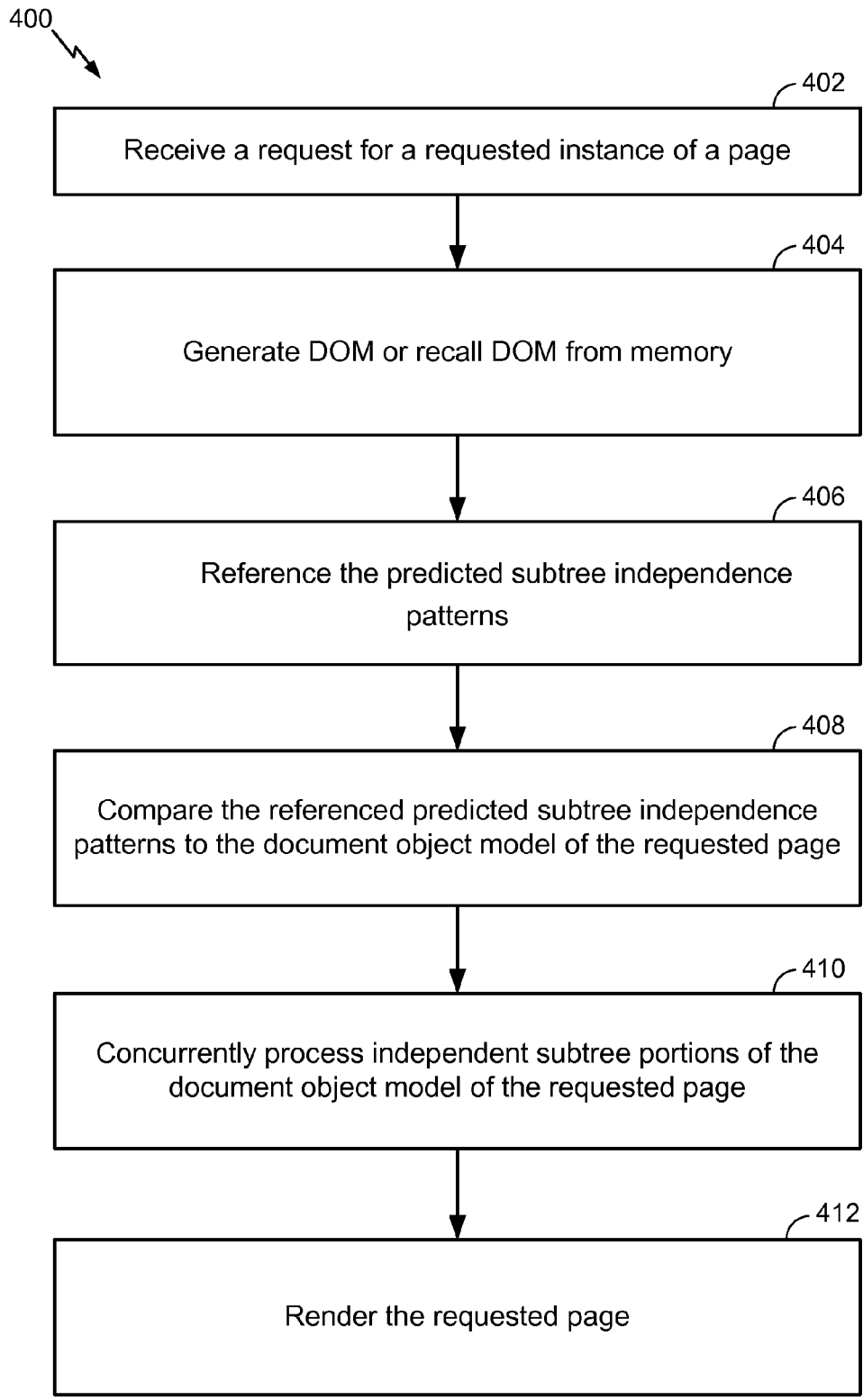
FIG. 4 is a process flow diagram of an aspect method for rending a page.

An aspect method 400 for rendering a page is illustrated in FIG. 4. In method 400 at block 402, a computing device may receive a request for a requested instance of a page. In block 404, a processor of the computing device may begin the process of rendering a page by generating a DOM, or recalling a DOM for the requested page that is stored in memory. In block 406, the computing device processor may reference predicted sub-tree independence patterns that may be stored in memory. In one aspect, a trained classifier may compare node features as an input and output layout independence conclusions in this operation.

In block 408, the processor may compare the referenced predicted sub-tree independence patterns stored in memory to the generated DOM of the requested page. In block 410, the flows sub-trees which are identified as being independent or conditionally independent may then be concurrently processed as part of rendering the page. Finally, in block 412, the requested page is rendered on the display of the computing device.

Figure 5:
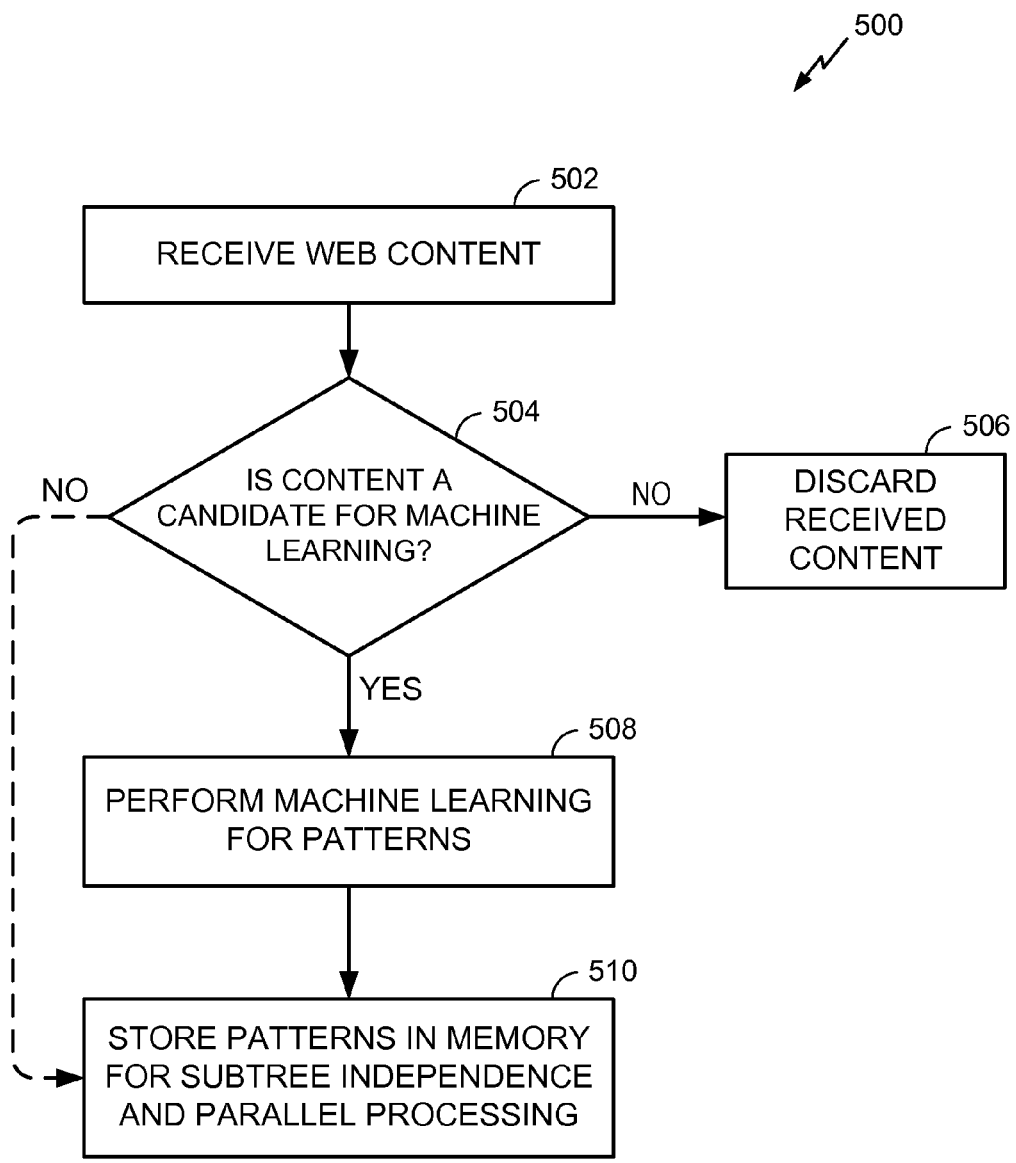
FIG. 5 is a process flow diagram of an aspect method for receiving web content to recognize patterns in the web content useful in determining sub-trees which may be processed concurrently.

An aspect method 500 for machine learning analysis to observe patterns in layout independence correlated to web page element information is illustrated in FIG. 5. Method 500 may be accomplished at one time for a large number of webpage renderings, such as by processing a data store of webpage information. Alternatively, method 500 may be integrated within a web browser so that the method is implemented during rendering of a web page, enabling him to patterns may be learned as web pages are rendered. With In method 500 at block 502, web content is received, which may be in the form of HTML, CSS, JavaScript or any of the web page elements reference above, and may be accompanied by processing instructions. At determination block 504, a processor of the computing device may determine whether the received data is a candidate for machine learning analysis and whether it is in a form suitable for input to the machine reading algorithm to learn patterns. If the processor determines the content is not machine readable and not a candidate for machine learning (i.e., determination block 504="NO"), the processor may discard the received data at block 506, or optionally, index and store the data in block 510. If the processor determines that the content is a candidate for machine learning (i.e., determination block 504="YES"), at block 508, the machine learning may be performed to detect patterns in layout independence correlated to web page element information from the received content. At block 510, any recognized patterns may be stored in the memory in a manner suitable for use in training a classifier or to be accessed by a scheduling algorithm.

Figure 6:
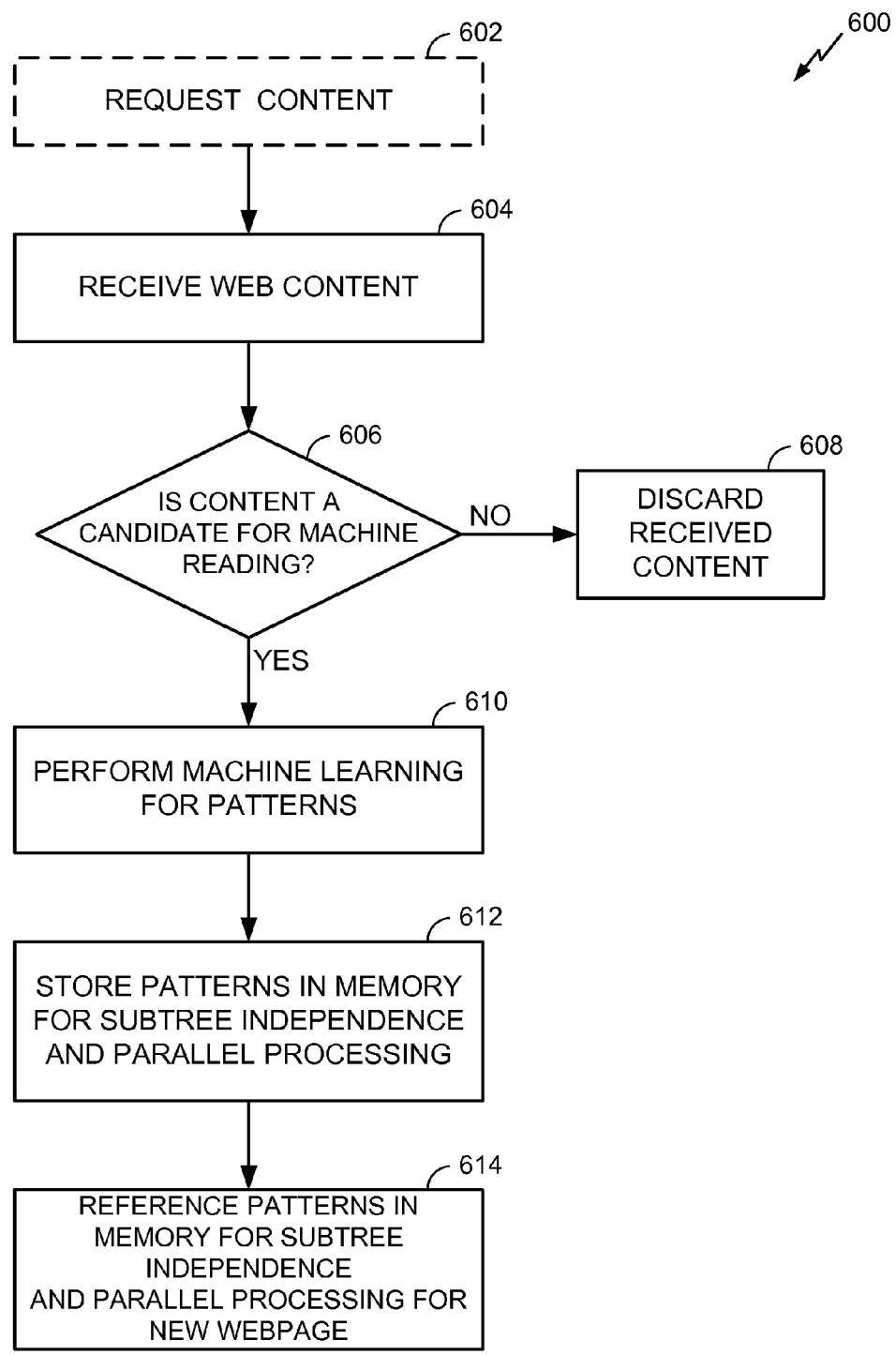
FIG. 6 is a process flow diagram of an aspect method for recognizing patterns useful in determining sub-trees which can be processed concurrently, and referencing the patterns to concurrently process the DOM sub-trees and render the web page.

An aspect method 600 for machine learning analysis to observe patterns in layout independence correlated to web page element information and to render a web page using parallel processing is illustrated in FIG. 6. In method 600 at block 602, a computing device may request content from one or more web pages, and received the content at block 604. At determination block 606, a processor implementing method 600 may determine whether the received content is a candidate for machine learning processing by analyzing the web content. If the processor determines that the content is not a candidate for machine learning (i.e., determination block 606="NO"), at block 608 the received content may be discarded. If the processor determines that the content is a candidate for machine learning (i.e., determination block 606="YES"), the processor may perform machine learning analysis of the web page element information to identify and correlate patterns to layout independence. At block 612, the identified patterns may be stored in a memory. At block 614, the patterns may be referenced in order to concurrently process independent sub-trees and render a new web page.

Figure 7:
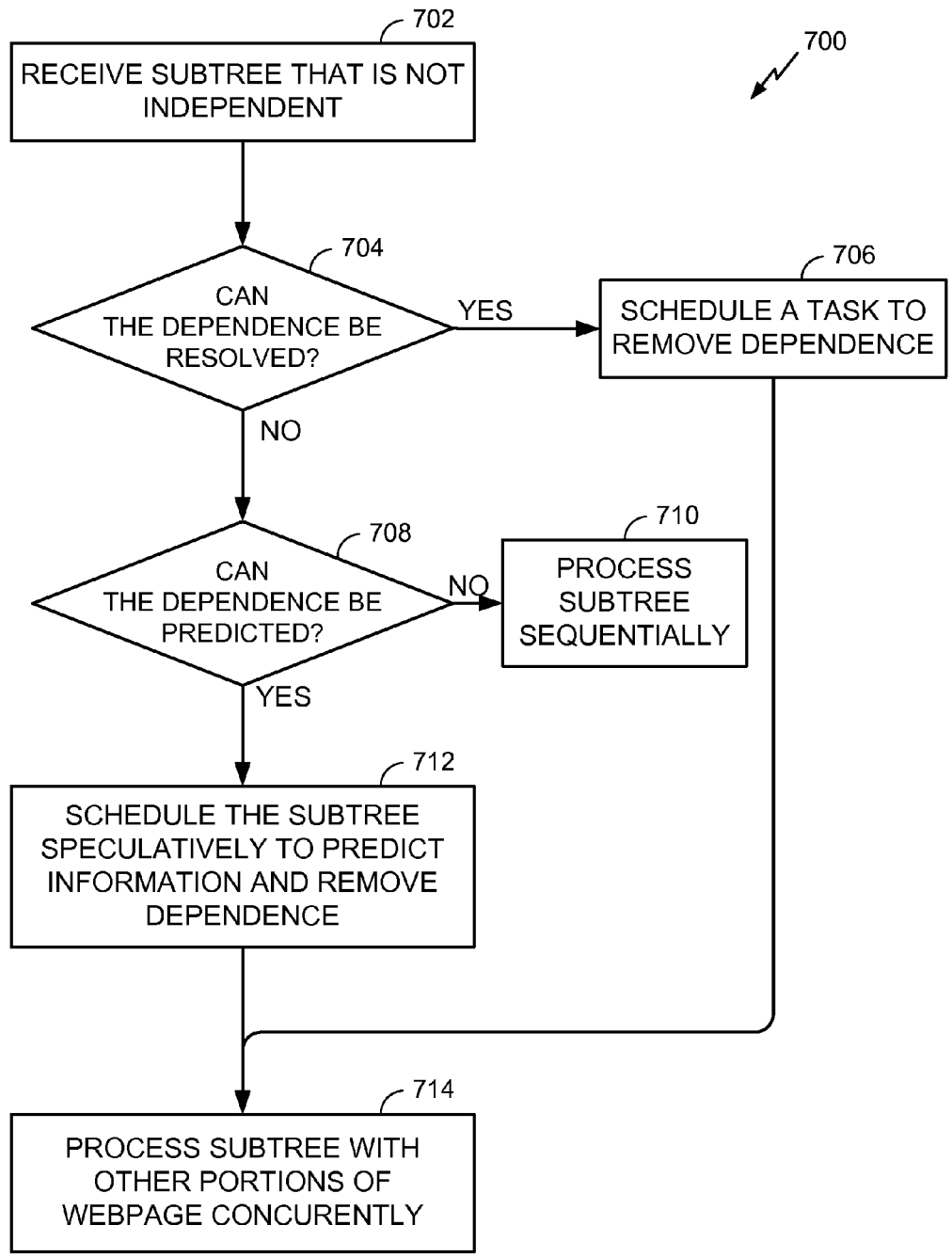
FIG. 7 is a process flow diagram of an aspect method for determining whether a sub-tree of a DOM tree can be independent if certain information is inferred.

An aspect method 700 for identifying conditionally independent sub-trees is illustrated in FIG. 7. In method 700 at block 702, semantically dependent sub-trees of the DOM tree 38 may be received. Semantically dependent sub-trees may be inferred from the patterns detected previously, or read from the actual sub-tree or DOM tree 38. At determination block 704, a processor implementing method 700 may determine whether the dependency of the received sub-tree can be resolved. If the processor determines that the sub-tree can be resolved (i.e., determination block 704="YES"), at block 706, the processor may schedule a task to removed the dependence at block 706. This task to remove the dependency may be scheduled to occur promptly in order to enable the sub-tree to be processed concurrently. At block 714, the sub-tree with resolved dependency may be processed concurrently with other portions of the web page processing to render the web page.

If the processor determines that the dependency of the sub-tree cannot be resolved (i.e., determination block 704="NO"), a processor implementing method 700 may determine whether the dependency can be predicted in determination block 708. If the processor determines that the dependency can be predicted (i.e., determination block 708="YES"), at block 712 the processor may predict the information necessary to remove the dependency of the nodes in order to render the particular sub-tree independent, thereby enabling concurrent processing based on speculation (i.e., speculating as to the information that removes the dependency). In block 714 the sub-tree may be processed concurrently based on speculation concurrently with other portions of the web page to render the web page. However, If the processor determines that the dependency cannot be predicted (i.e., determination block 708="YES"), the received data may be processed in standard series fashion to render the page at block 710.

Figure 8:
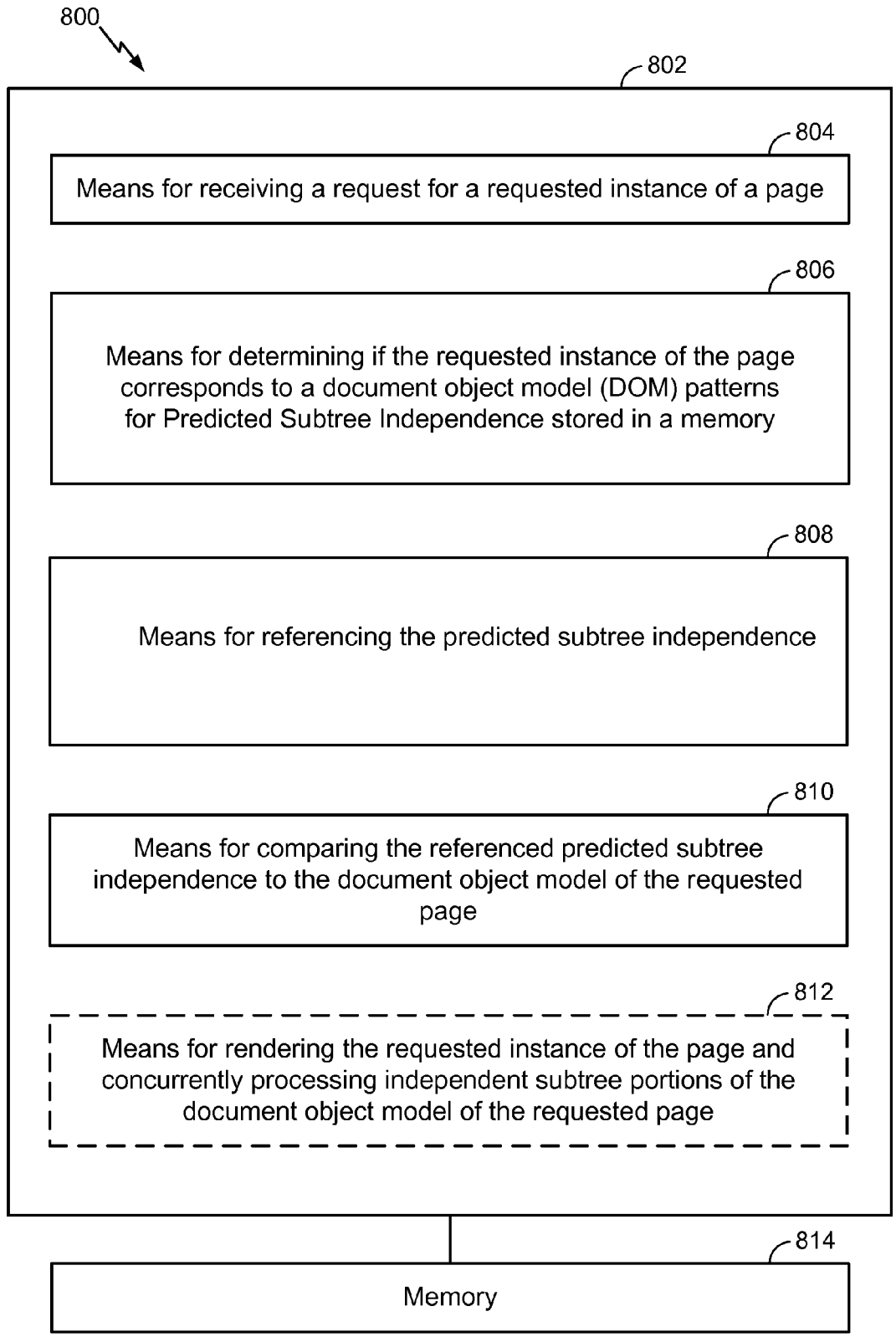
FIG. 8 is a block diagram of an aspect apparatus for rendering a page.

FIG. 8 illustrates components of an apparatus (e.g., a computing device) 800 that renders pages, such as web pages, received from a web server and data server via a content provider. The apparatus 800 may include functional components in the form of a processor configured with software and/or firmware. Apparatus 800 may include a logical grouping of electrical components 802 that facilitate receiving web resources and data corresponding to a page, and rendering an instance of the page. The logical grouping of electrical components 802 may include a means for receiving, such as at a computing device, a request for a requested instance of a page 804. Further, the logical grouping of electrical components 802 may include a means for determining if the requested instance of the page corresponds to a document object model (DOM) patterns for predicted sub-tree independence stored in a memory 806, wherein the patterns stored in memory predict sub-tree independence based on element information in the web page script.

Also, the logical grouping of electrical components 802 may include a means for referencing the predicted sub-tree independence stored in the memory 808. Additionally, the logical grouping of electrical components 802 may include a means for comparing the referenced predicted sub-tree independence to the document object model 38 of the requested page. Optionally, the logical grouping of electrical components 802 may include a means for rendering the requested instance of the page and concurrently processing the independent sub-tree portions of the DOM of the requested page 812. Thus, the apparatus 800 may efficiently use the predicted sub-tree independence learned from the patterns to concurrently process portions of a web page to be rendered and render the web page in a rapid manner.

Additionally, the apparatus 800 may include a memory 814 that retains instructions for executing functions associated with electrical components 804, 806, 808, 810 and optionally 812. While shown as being external to memory 814, it is to be understood that electrical components 804, 806, 808, 810 and optionally 812 may exist within or encompass portions of the memory 814.

In the various aspects, certain sub-trees may be identified or predicted to be independent, while other sub-trees may be predicted to be dependent, and yet others may be predicted to be conditionally independent. Using the machine learning analysis to identify patterns thus certain sub-trees may be predicted to be independent and may be concurrently processed. Other conditional independent sub-trees may be made to be independent sub-trees. This may enable processing of the DOM tree 38 in a more rapid manner by concurrently or parallel processing the sub-trees. In one aspect, a first processor may process a first independent sub-tree and a second processor may at the same time process a second independent sub-tree, or the DOM tree to provide for execution of multiple computational threads.

Figure 9:
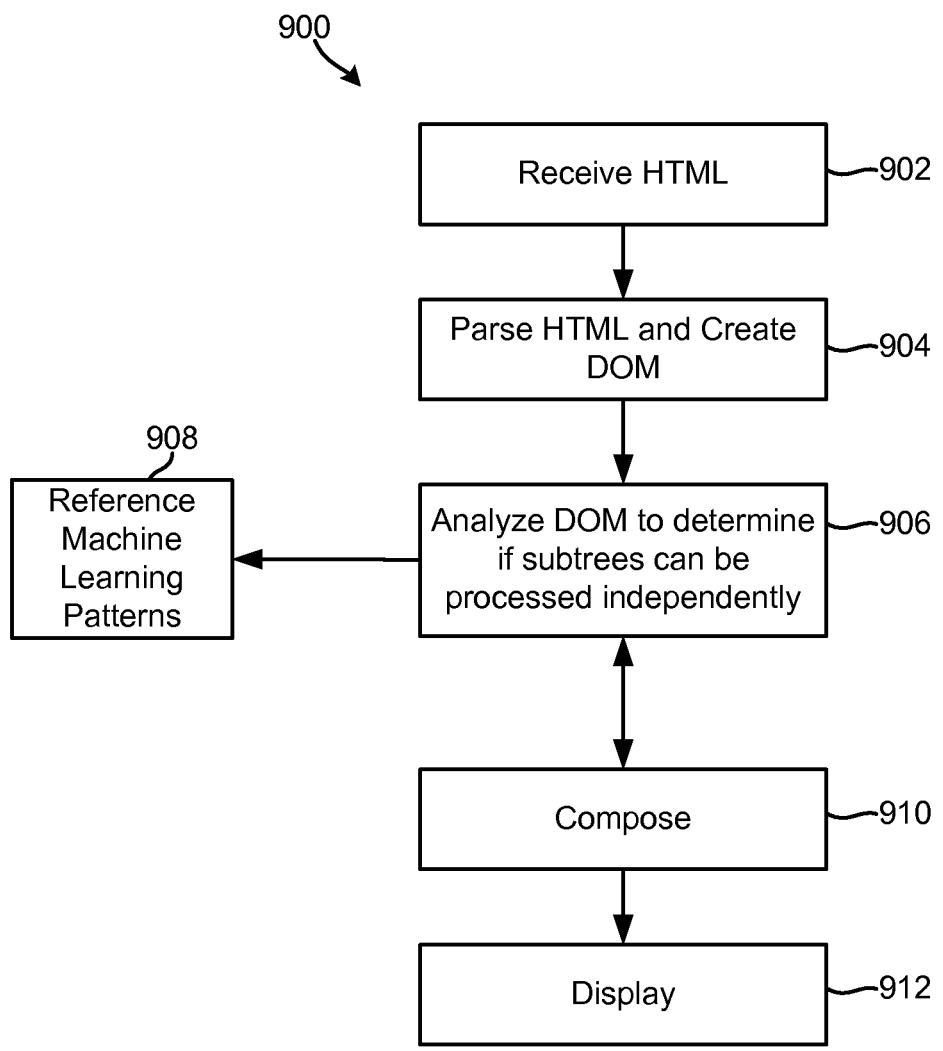
FIG. 9 is a process flow diagram of an aspect method for analyzing a DOM tree, and referencing machine learned patterns to determine if any sub-trees of the DOM tree can be processed concurrently on a first execution of a browser and/or first occurrence of a web page.

FIG. 9 illustrates an aspect method 900 for processing a DOM tree on a first execution of a browser or first rendition of a particular web page having an unidentified DOM structure. In method 900, the browser may receive HTML code from a remote or local server corresponding to a desired web page in block 902. The browser may parse the received HTML and create the DOM tree in block 904. In block 906, the browser may analyze the DOM tree to determine if at least one sub-tree may be processed independently. In block 908, the browser may reference a number of patterns that are machine learned and provided in an index or the like for ease of reference. Identified independent sub-trees of the DOM tree may be concurrently processed and HTML code for outputting to a display in block 910. In block 912, the browser may display the composed and processed HTML code along with all the associated images and files on an electronic display of the computing device on which the browser is running.

Figure 10:
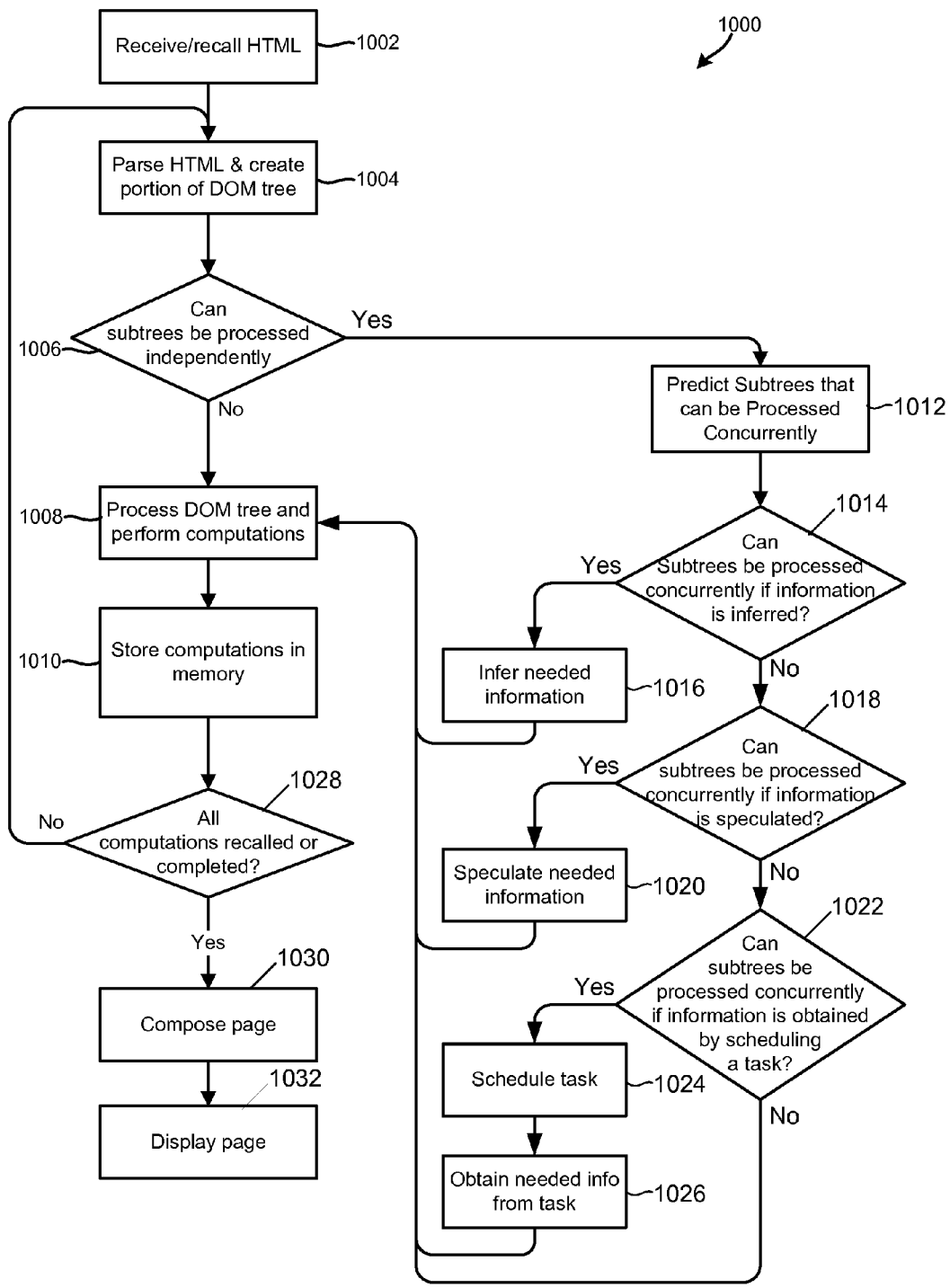
FIG. 10 is a process flow diagram of an aspect method for analyzing a DOM tree, and referencing certain machine learned patterns to determine if any sub-trees of the DOM tree are independent and that can be processed concurrently on executions of a web browser.

An aspect method 1000 for processing the DOM tree is illustrated in FIG. 10 with additional functional details and specificity. In method 1000 in block 1002, the processor of a computing device may receive in a Web browser application HTML code from a server and/or recall HTML code from cache memory. In block 1004, the browser may parse the HTML code and create at least a portion of a DOM tree for the received HTML code.

In determination block 1006, the processor may determine whether at least one sub-tree of the DOM tree matches any machine learned patterns indicating that it may be processed independently. In various aspects, the processor may make this determination by evaluating an output of a classifier module that predicts sub-tree independence based on element information in a web page script. In various aspects, the processor may execute, or initiate the execution of, one or more algorithms to determine whether portions of the generated DOM tree match any of the patterns stored in memory from the machine learning algorithm. In determination block 1006, the processor may determine if portions of the generated DOM tree are structurally identical and/or structurally similar to patterns of the independent DOM sub-trees stored in memory. The processor in determination block 1806 may further examine nodes and nodal relationships to determine which sub-trees may be processed independently.

If the processor determines that the portion of the DOM sub-tree does not match the structure of any of the patterns stored in memory (i.e., determination block 1006="NO"), in block 1008, the processor may process the generated portion of the DOM tree and perform the associated computations (e.g., calculate the absolute positions of the elements, styles, perform CSS matching, etc.). In block 1010, the processor may store the computation results with the results indexed to the executed portions of the DOM tree.

If the processor determines that at least one sub-trees of the DOM tree is structurally the same as and/or structurally similar to the patterns stored in memory (i.e., determination block 1006="YES"), in block 1012 the machine trained classifier module may be used to predict the sub-trees that can be processed concurrently.

In determination block 1014, the processor may determine if the sub-tree can be processed concurrently if information is inferred and provided to the sub-tree to make the sub-tree independent. If so, (i.e., determination block 1014="YES"), the processor will inferred the required information at block 1016 and processing returned to block 1008 for concurrent processing of the sub-tree.

If the processor determines that the sub-tree cannot be processed concurrently using inferred information (i.e., determination block 1014="NO"), the processor may determine whether the sub-tree can be rendered independent and processed concurrently if the information is predicted or supplied based on speculation in determination block 1018. If so (i.e., determination block 1018="YES"), the required information is supplied based upon speculation in block 1020 and processing returned to block 1008 for concurrent processing of the sub-tree.

If the processor determines that the sub-tree cannot be processed concurrently using speculated information (i.e., determination block 1018="NO"), at determination block 1022 the processor may determine if the sub-tree can be processed concurrently if information can be obtained by executing computations that would render the sub-tree independent. Such computation can be encapsulated in a task (i.e., determination block 1022="YES"), and the processor may schedule the required computation task at block 1024, and received the required information at block 1026. At this point, processing returns to block 1008 for concurrent processing of the sub-tree.

As the processing of the DOM tree and calculations are completed at block 1008, the resulting calculations are stored in memory in block 1010. At determination block 1028, the processor may determine if all necessary computations have been computed. If all computations are not complete (i.e., determination block 1028="NO"), the browser may parse another section of the HTML code to generate additional portions of the DOM tree by returning to block 1004. If all the computations are complete (i.e., determination block 1028="YES"), the browser may validate the data and compose the page for rendering in block 1030, and display the page on an electronic display of a computing device in block 1032.

Figure 11:
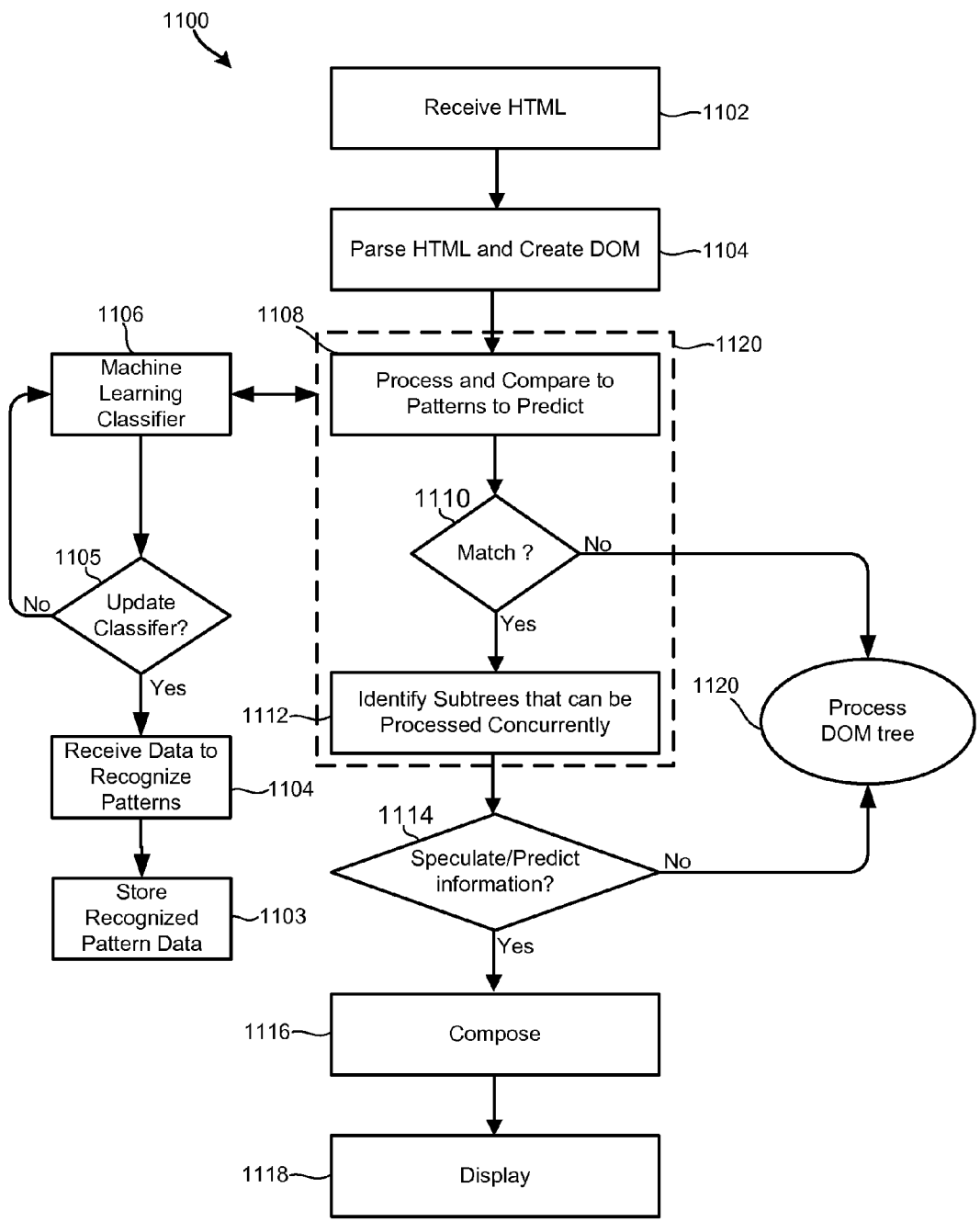
FIG. 11 is a process flow diagram of another aspect method for analyzing a DOM tree, and referencing certain machine learned patterns to determine if any sub-trees of the DOM tree are independent and that can be processed concurrently or can be processed if certain information is supplied, calculated or inferred, and determining if the machine trained classifier may be periodically updated.

An alternative aspect method 1100 for processing portions of a DOM tree is illustrated in FIG. 11. In aspect method 1100, a machine trained classifier can be updated to recognize additional patterns to improve the accuracy of the sub-tree independence prediction based on new gathered web element information and the like. In method 1100 at block 1102, the processor operating a browser application may receive HTML code from a cache memory and/or a remote server. At block 1104, the processor may parse the received HTML and generate one or more portions of a DOM tree based on the received HTML. In block 1108, the processor may process and compare the patterns with the DOM tree to be rendered. In determination block 1110, the processor may determine whether the DOM tree matches any patterns in memory. If the processor determines that the portions of the DOM tree do not match any of the patterns in memory (i.e., determination block 1110="NO"), the browser may traverse the DOM tree and performing the associated calculations to render the DOM tree in a normal fashion at block 1120.

If the processor determines that the portions of the DOM tree do match one or more patterns and memory (i.e., determination block 1110="YES"), the processor may determine that the sub-trees are independent or conditionally independent. At block 1112, the processor may identify DOM sub-trees that can be processed concurrently using the scheduling algorithm. In determination block 1114, the processor may identify conditionally independent sub-trees, such as based upon comparing the sub-trees to patterns stored in memory. If so (i.e., determination block 1114="YES"), the conditionally independent sub-trees may be rendered independent by speculating, predicting, inferring or by determining information to make the conditionally independent sub-trees independent.

If no conditionally independent sub-trees are identified (i.e., determination block 1114="NO"), the browser may process the generated portions of the HTML calculations by traversing the DOM tree and performing the associated calculations as described above at block 1120. If the conditionally independent sub-trees are rendered (i.e., determination block 1114="YES"), the browser may compose the page in block 1116, and display the resultant HTML web page on an electronic display in block 1118.

During the operations at block 1108, the processor may access the machine learning algorithm and classifier at block 1106. In one aspect, the classifier may have a number of static patterns that may be updated after a predetermined period or in a dynamic manner, or at the request of a server, browser or user. At determination block 1105, the processor may determine whether the machine trained algorithm and classifier should be updated. If so, (i.e., determination block 1105="YES"), the processor may receive and gather web page element information from a number of web pages and perform machine learning analysis to recognize patterns that predict sub-tree independence at block 1104. For example, the classifier 1106 may have a first set of patterns and be updated with a second set of patterns to supplement the first set. In another aspect, the second set may replace the first set. At block 1103 the processor may store the recognize patterns, which may be updated and used at block 1108 to compare to a new DOM tree.

In an alternative aspect, the patterns may be updated in a dynamic, automatic and/or periodic manner. Web pages may be processed and web page element information may be gathered for performing machine learning analysis to identify patterns in layout independence correlated to web page element information. It should be appreciated that web pages may evolve over time and the web page element information may change and evolve based on observation of new patterns and the machine learning analysis will capture patterns in new data.

Figure 12:
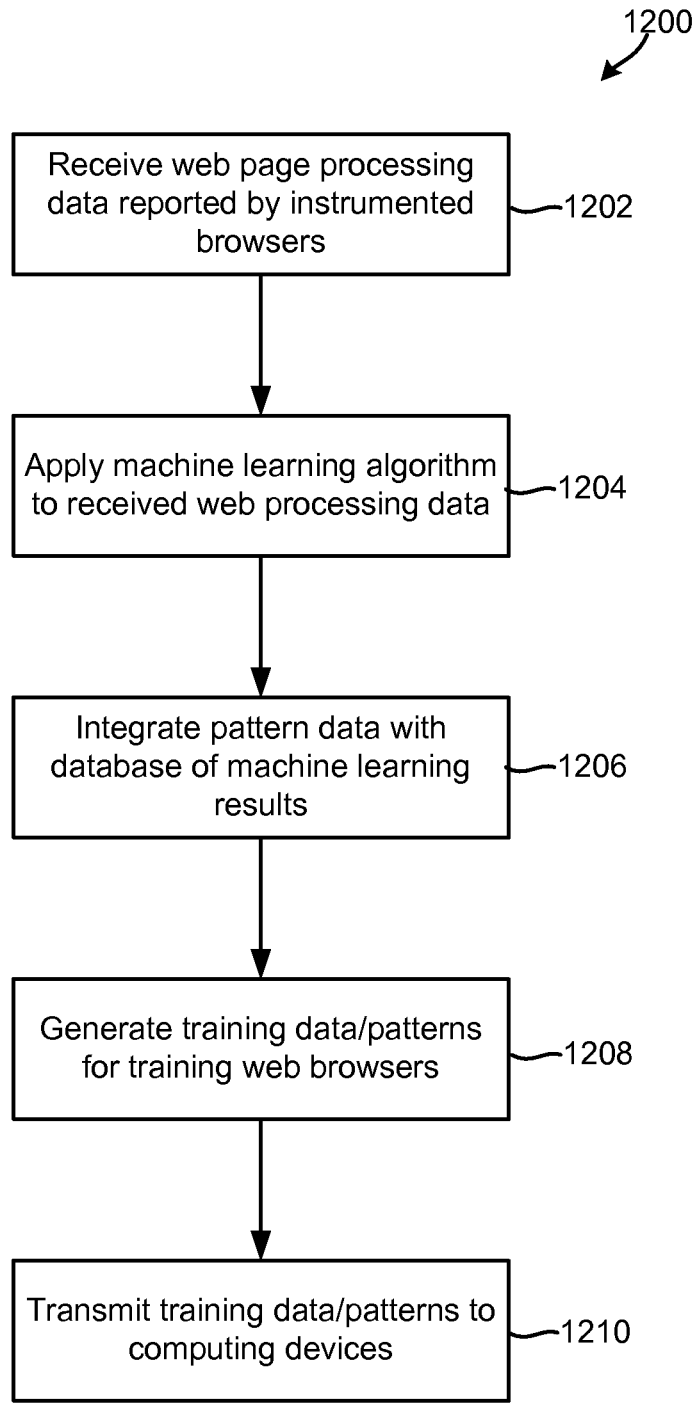
FIG. 12 is a process flow diagram of an aspect method 4 processing webpage processing data in a server with a machine learning algorithm to identify patterns and training data that can be used to train Web browsers.

As discussed above, in some aspects the application of machine learning algorithms to webpage information may be accomplished in a centralized server so that the webpage processing of several computing devices can be used to generate pattern information for a wide variety of Internet webpages. An aspect method 1200 for analyzing webpage processing information at a central server is illustrated in FIG. 12. In method 1200 at block 1202, a server coupled to a communications network such as the Internet may receive webpage processing data reported by instrumented Web browsers on a number of computing devices coupled to the network. Misreporting of webpage processing data may use any of a variety of data structures and data reporting methods well known in the Internet communication arts. Received webpage processing data may be stored within the server to build up a database of processing data for analysis. At block 1204, the server may apply machine learning algorithms to the received web processing data. As described above, such algorithms may be configured to identify patterns within a webpage scripts or down trees that correlate to independence or conditional independence of sub-trees. At block 206, the server may integrate pattern data identified from processing the received web processing data with other machine learning pattern data stored within the database. In this operation, previously generated pattern data may be combined or merged with the current pattern data to result in an updated or replaced data set of patterns. At block 1208, the resulting pattern data may be used to generate training data or patterns that are suitable for training computing device web browsers, such as the trainable classifier included within computing device web browser applications. At block 1210, this generated training data may be transmitted to computing devices, such as via a communications network like the Internet. Such transmission or training data may be provided as a service or subscription so that only those computing devices signed up with the server receive such information. In a further aspect, the training or pattern data may be provided to web hosting companies so that the information may be included as metadata in their webpage HTML scripts. The aspect method 1200 and enable such a central server to benefit from the webpage brat rendering operations of hundreds if not thousands of computing devices, thereby enabling the development of pattern recognition and training data sets that are relevant to a wide cross-section of webpages available on the Internet.

As can be seen from the foregoing descriptions, the operations of gathering information on web page rendering, generating element data from the web page rendering information, performing machine learning analyses on the element data and training a browser to use the results of the machining learning analysis may be accomplished in different computing devices in a variety of implementations. For example, the aspects may be implemented solely within a single computing device browser (e.g., an instrumented browser), partially within a plurality of computing devices and one or more servers, and substantially within one or more servers which receive web page rendering information from a plurality of computing devices. In particular, various aspects include a method (which may be implemented in a computing device configured with executable instructions to perform the method) that includes operations of processing a plurality of web pages and gathering web page element information, performing machine learning analysis on the gathered web page element information to identify patterns in layout independence correlated to web page element information, training a classifier to predict sub-tree independence based on element information in a web page script, and using the predicted sub-tree independence to concurrently process portions of a web page to be rendered.

In a first example aspect, this method may be implemented within a single computing device in which processing a plurality of web pages and gathering web page element information is accomplished in an instrumented browser operating on the single computing device, and performing machine learning analysis on the gathered web page element information to identify patterns in layout independence correlated to web page element information is accomplished in the same computing device.

In a second example aspect, this method may be implemented in a network of computing devices and a server in which processing a plurality of web pages and gathering web page element information includes processing a plurality of web pages and gathering web page element information in the plurality of computing devices, transmitting to the server from each of the plurality of computing devices the gathered web page information, receiving and aggregating in the server the web page information transmitted by the plurality of computing devices to generate aggregated web page element information, transmitting aggregated web page element information to at least one of the plurality of computing devices, and receiving in the at least one of the plurality of computing devices the transmitting aggregated web page element information. Further in this aspect performing machine learning analysis on the gathered web page element information to identify patterns in layout independence correlated to web page element information is accomplished in the at least one of the plurality of computing devices on the received aggregated web page element information, and training a classifier to predict sub-tree independence based on element information in a web page script comprises training a classifier operating in the at least one of the plurality of computing devices to predict sub-tree independence based on machine learning analysis performed on the received aggregated web page element information.

In a third example aspect, processing a plurality of web pages and gathering web page element information may include processing a plurality of web pages and gathering web page element information in a plurality of computing devices, transmitting to a server from each of the plurality of computing devices (e.g., via the Internet) the gathered web page information, and receiving in the server the web page information transmitted by the plurality of computing devices to generate aggregated web page element information. In this third example aspect, performing machine learning analysis on the gathered web page element information to identify patterns in layout independence correlated to web page element information may be accomplished in the server on the received web page information transmitted by the plurality of computing devices to identify patterns in layout independence, and the method may further include transmitting from the server to at least one of the plurality of computing devices (e.g., via the Internet) the identified patterns in layout independence, and receiving in the at least one of the plurality of computing devices the identified patterns in layout independence. Further in this example aspect, training a classifier to predict sub-tree independence based on element information in a web page script may include training a classifier operating in the at least one of the plurality of computing devices to predict sub-tree independence based on the received identified patterns in layout independence.

Figure 13:
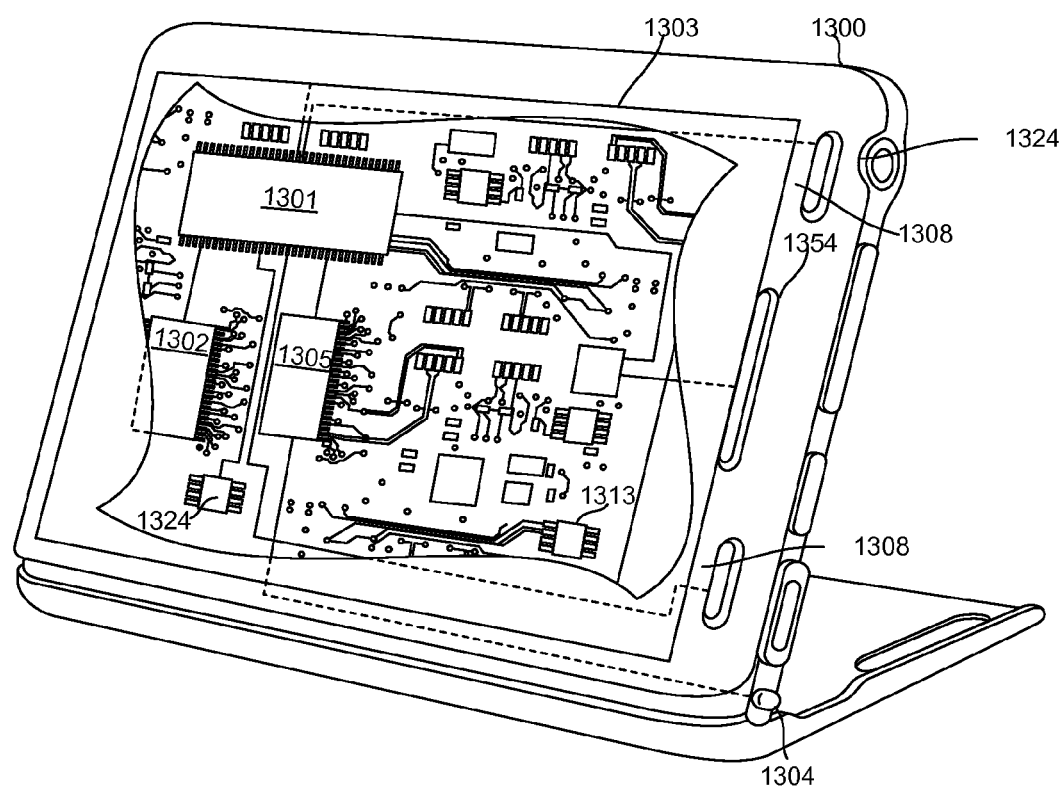
FIG. 13 is a component block diagram of an example receiver device suitable for use with the various aspects.
Figure 14:
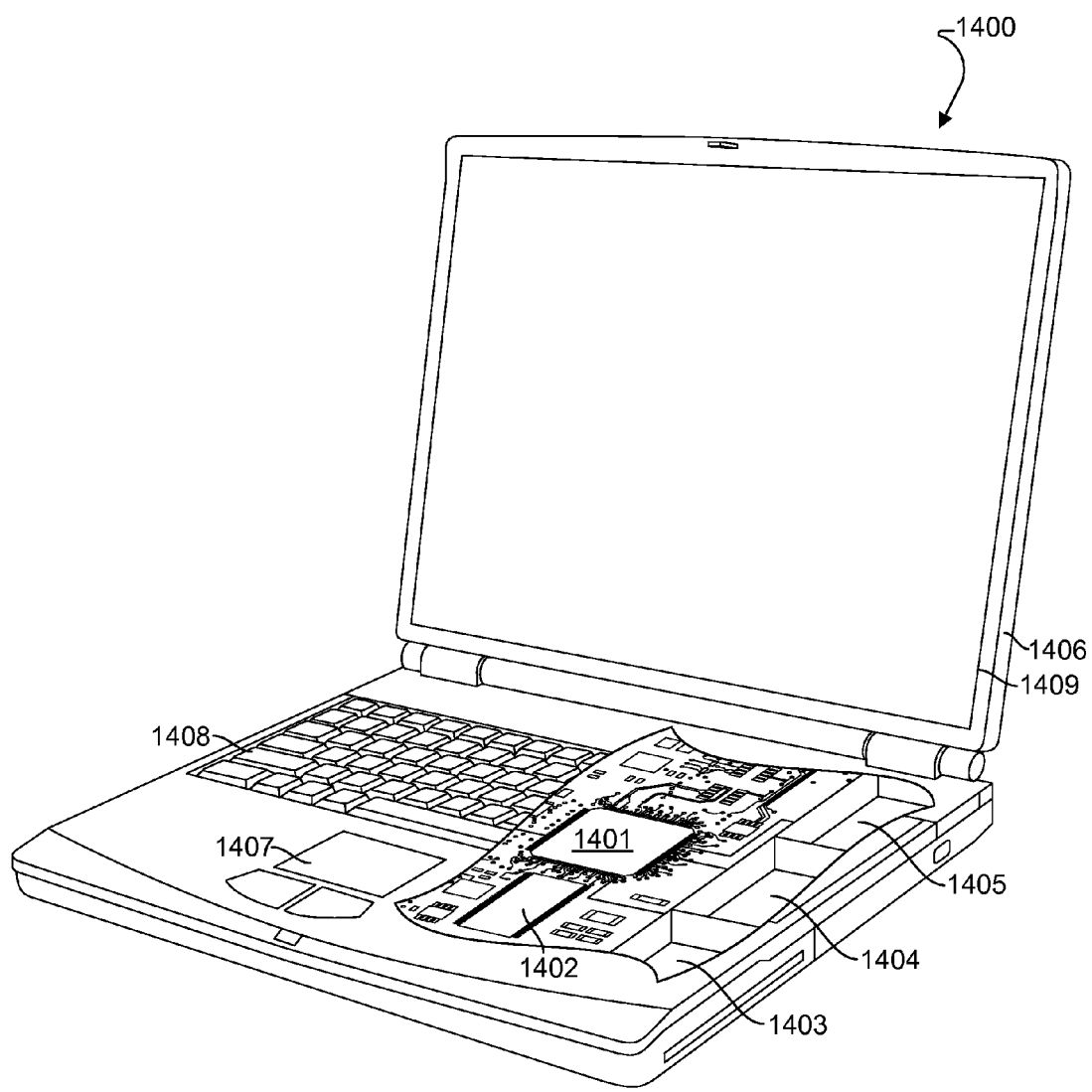
FIG. 14 is a component block diagram of an example server suitable for use with various aspects.

FIG. 13 is a system block diagram of a mobile computing device suitable for use with any of the aspects. A typical mobile computing device 1300 may include a processor 1301 coupled to internal memory 1302, a display 1303, and to a speaker 1354. The processor 1301 may be a multi-core processor or more than one processor may be included in the mobile computing device 1300 to enable concurrently process portions of the web page. Additionally, the mobile computing device 1300 may include an antenna 1304 for sending and receiving electromagnetic radiation that may be connected to a wireless data link and/or cellular telephone transceiver 1305 coupled to the processor 1301 and a mobile computing device 1324 coupled to the processor 1301. Mobile computing device 1300 typically also include menu selection buttons or rocker switches 1308 for receiving user inputs.

The aspects described above may also be implemented within a variety of computing devices, such as a laptop computer 1400 as illustrated in FIG. 15. Many laptop computers include a touch pad touch surface that serves as the computer's pointing device, and thus may receive drag, scroll, and flick gestures similar to those implemented on mobile computing devices equipped with a touch screen display. A laptop computer 1400 will typically include a processor 1401 coupled to volatile memory 1402 and a large capacity nonvolatile memory, such as a disk drive 1403. The processor 1401 may be a multi-core processor or more than one processor may be included in the computer 1400 to enable concurrently process portions of the web page. The computer 1400 may also include a floppy disc drive 1404 and a compact disc (CD) drive 1405 coupled to the processor 1401. The computing device 1400 may also include a number of connector ports coupled to the processor 1401 for establishing data connections or receiving external memory devices, such as a USB or FireWire® connector sockets, or other network connection circuits 1406 for coupling the processor 1401 to a network. In a notebook configuration, the computer housing includes the touchpad 1407, keyboard 1408, and the display 1409 all coupled to the processor 1401. Other configurations of computing device may include a computer mouse or trackball coupled to the processor (e.g., via a USB input) as are well known.

The processors 1301, 1401 may be any programmable microprocessor, microcomputer or multiple processor chip or chips that may be configured by software instructions (applications) to perform a variety of functions, including the functions of the various aspects described below. As mentioned above, the processors 1301, 1401 may be multi-core processors or configured to work with multiple processors within the same computing device in order to enable concurrent processing of web pages. In some mobile receiver devices, multiple processors 1401 may be provided, such as one processor dedicated to wireless communication functions and one processor dedicated to running other applications. Typically, software applications may be stored in the internal memory 1302, 1402, and 1403 before they are accessed and loaded into the processor 1301, 1401. The processor 1301, 1401 may include internal memory sufficient to store the application software instructions.

The foregoing method descriptions and the process flow diagrams are provided merely as illustrative examples, and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such a non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of, non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for accelerating web page rendering, comprising:
    processing a plurality of web pages and gathering web page element information;
    performing machine learning analysis on the gathered web page element information to identify patterns in layout independence correlated to web page element information;
    training a classifier to predict sub-tree independence based on element information in a web page; and
    using the predicted sub-tree independence to concurrently process portions of a web page to be rendered.

2. The method of claim 1, wherein using the predicted sub-tree independence to concurrently process portions of a web page to be rendered comprises:
    predicting that a sub-tree is a priori independent based on the web page element information in the web page; and
    forming a task out of the a priori independent part of a DOM tree.

3. The method of claim 1, further comprising:
    predicting, based on the element information in the web page that a sub-tree would be conditionally independent if certain information is determined;
    performing a task to obtain the certain information; and
    forming a task out of the conditionally independent part of a DOM tree using the obtained certain information.

4. The method of claim 3, wherein performing a task to obtain the certain information comprises promptly computing the certain information.

5. The method of claim 3, wherein performing a task to obtain the certain information comprises determining the certain information based on speculation.

6. The method of claim 1, further comprising:
    gathering web page element information that comprises at least one of web page element layout size, position, CSS style attributes, sub-tree size, HTML tag, parent HTML tag, and web page feature information.

7. The method of claim 1, further comprising using the predicted sub-tree independence to determine that a sub-tree of a DOM tree of the web page is not independent and that the sub-tree cannot be concurrently processed.

8. The method of claim 1, further comprising using a single web browser to perform the machine learning analysis and to predict sub-tree independence to concurrently process portions of the web page.

9. The method of claim 1, further comprising:
    performing machine learning analysis in a first computing device using a first processor; and
    predicting sub-tree independence to concurrently process portions of the web page in a second different computing device using a second processor.

10. The method of claim 1, further comprising updating the classifier by processing a plurality of updated web pages and gathering updated web page element information and performing machine learning analysis on the gathered web page element information to identify additional patterns in layout independence correlated to web page element information.

11. The method of claim 1, further comprising gathering web page element information using an instrumented browser operating on a computing device, wherein:
    processing a plurality of web pages and gathering web page element information is accomplished in the instrumented browser; and
    performing machine learning analysis on the gathered web page element information to identify patterns in layout independence correlated to web page element information is accomplished in the same computing device.

12. The method of claim 1, wherein processing a plurality of web pages and gathering web page element information comprises:
    processing a plurality of web pages and gathering web page element information in a plurality of computing devices;
    transmitting to a server from each of the plurality of computing devices the gathered web page information;
    receiving and aggregating in the server the web page information transmitted by the plurality of computing devices to generate aggregated web page element information;
    transmitting aggregated web page element information to at least one of the plurality of computing devices; and
    receiving in the at least one of the plurality of computing devices the transmitting aggregated web page element information n, and
    wherein:
    performing machine learning analysis on the gathered web page element information to identify patterns in layout independence correlated to web page element information is accomplished in the at least one of the plurality of computing devices on the received aggregated web page element information; and
    training a classifier to predict sub-tree independence based on element information in a web page script comprises training a classifier operating in the at least one of the plurality of computing devices to predict sub-tree independence based on machine learning analysis performed on the received aggregated web page element information.

13. The method of claim 1,
    wherein processing a plurality of web pages and gathering web page element information comprises:
    processing a plurality of web pages and gathering web page element information in a plurality of computing devices;
    transmitting to a server from each of the plurality of computing devices the gathered web page information; and
    receiving in the server the web page information transmitted by the plurality of computing devices to generate aggregated web page element information, wherein performing machine learning analysis on the gathered web page element information to identify patterns in layout independence correlated to web page element information comprises performing machine learning analysis in the server on the received web page information transmitted by the plurality of computing devices to identify patterns in layout independence, the method further comprising:

transmitting from the server to at least one of the plurality of computing devices the identified patterns in layout independence; and receiving in the at least one of the plurality of computing devices the identified patterns in layout independence, wherein training a classifier to predict sub-tree independence based on element information in a web page script comprises training a classifier operating in the at least one of the plurality of computing devices to predict sub-tree independence based on the received identified patterns in layout independence.

14. The method of claim 1, further comprising the classifier predicting sub-tree independence based on the element information in the web page script, wherein the classifier provides sub-tree independence data to a scheduling algorithm.

15. The method of claim 14, further comprising the scheduling algorithm using the predicted sub-tree independence to concurrently process portions of the web page.

16. The method of claim 1, further comprising performing machine learning analysis on the gathered web page element information to identify patterns in layout independence correlated to presentation semantics in a predetermined style sheet language coding.

17. The method of claim 1, further comprising using the predicted sub-tree independence to render a first independent sub-tree of a DOM tree before rendering a second dependent sub-tree of the DOM tree.

18. The method of claim 1, further comprising:

continuously processing a plurality of web pages from the Internet and gathering web page element information;

continuously performing machine learning analysis on the gathered web page element information to identify patterns in layout independence correlated to web page element information; and updating the classifier to predict sub-tree independence based on element information in the web page script and the identified patterns.

19. The method of claim 1, further comprising:

processing a first set of web pages and gathering web page element information associated with the first set of web pages and performing machine learning analysis on the gathered web page element information to identify a first set of patterns;

using the first set of patterns associated with the predicted sub-tree independence of the first set of web pages to concurrently process portions to be rendered; and continuously updating the first set of patterns in a dynamic manner by gathering additional web page element information and performing machine analysis to identify additional patterns to supplement the first set of patterns in a continuous manner.

20. The method of claim 19, further comprising processing a second set of web pages and gathering web page element information to identify a second set of patterns and using the second set of patterns to update the first set of patterns.

21. The method of claim 1, further comprising performing machine learning analysis on the gathered web page element information to identify patterns in layout independence correlated to web page element information in HTML coding.

22. The method of claim 21, wherein HTML coding includes a first sub-tree of the DOM tree that indicates a parallel processing capability, wherein HTML coding also includes a second sub-tree that is silent as to the parallel processing capability of the second sub-tree, and wherein the classifier predicts sub-tree independence of the second sub-tree of web page elements based on element information in the web page script.

23. A computing device, comprising:

a display;

an internal memory; and a processor coupled to the display and the internal memory, wherein the processor is configured with processor-executable instructions to perform operations comprising:

processing a plurality of web pages and gathering web page element information;

performing machine learning analysis on the gathered web page element information to identify patterns in layout independence correlated to web page element information;

training a classifier to predict sub-tree independence based on element information in a web page; and using the predicted sub-tree independence to concurrently process portions of a web page to be rendered.

24. The computing device of claim 23, wherein the processor is configured with processor-executable instructions to perform operations such that using the predicted sub-tree independence to concurrently process portions of a web page to be rendered comprises:

predicting that a sub-tree is a priori independent based on the web page element information in the web page; and forming a task out of the a priori independent part of a DOM tree.

25. The computing device of claim 23, wherein the processor is configured with processor-executable instructions to perform operations further comprising:

predicting, based on the element information in the web page, that a sub-tree would be conditionally independent if certain information is determined;

performing a task to obtain the certain information; and performing a task out of the conditionally independent part of a DOM tree using the obtained certain information.

26. The computing device of claim 25, wherein the processor is configured with processor-executable instructions to perform operations such that performing a task to obtain the certain information comprises promptly computing the certain information.

27. The computing device of claim 25, wherein the processor is configured with processor-executable instructions to perform operations such that performing a task to obtain the certain information comprises determining the certain information based on speculation.

28. The computing device of claim 23, wherein the processor is configured with processor-executable instructions to perform operations further comprising gathering web page element information that comprises at least one of web page element layout size, position, CSS style attributes, sub-tree size, HTML tag, parent HTML tag, and web page feature information.

29. The computing device of claim 23, wherein the processor is configured with processor-executable instructions to perform operations further comprising using the predicted sub-tree independence to determine that a sub-tree of a DOM tree of the web page is not independent and that the sub-tree cannot be concurrently processed.

30. The computing device of claim 23, wherein the processor is configured with processor-executable instructions to perform operations further comprising using a single web browser to perform the machine learning analysis and to predict sub-tree independence to concurrently process portions of the web page.

31. The computing device of claim 23, wherein the processor is configured with processor-executable instructions to perform operations further comprising:
updating the classifier by processing a plurality of updated web pages;
gathering updated web page element information; and
performing machine learning analysis on the gathered web page element information to identify additional patterns in layout independence correlated to web page element information.

32. The computing device of claim 23, wherein the processor is configured with processor executable instructions to perform operations such that processing a plurality of web pages and gathering web page element information is accomplished in an instrumented browser operating on the computing device.

33. The computing device of claim 23, wherein the processor is configured with processor-executable instructions to perform operations such that predicting sub-tree independence based on the element information in the web page script is performed by the classifier, wherein the classifier provides sub-tree independence data to a scheduling algorithm.

34. The computing device of claim 33, wherein the processor is configured with processor-executable instructions to perform operations such that the scheduling algorithm uses the predicted sub-tree independence to concurrently process portions of the web page.

35. The computing device of claim 23, wherein the processor is configured with processor-executable instructions to perform operations further comprising performing machine learning analysis on the gathered web page element information to identify patterns in layout independence correlated to presentation semantics in a predetermined style sheet language coding.

36. The computing device of claim 23, wherein the processor is configured with processor-executable instructions to perform operations further comprising using the predicted sub-tree independence to render a first independent sub-tree of a DOM tree before rendering a second dependent sub-tree of the DOM tree.

37. The computing device of claim 23, wherein the processor is configured with processor-executable instructions to perform operations further comprising:
continuously processing a plurality of web pages from the Internet and gathering web page element information;
continuously performing machine learning analysis on the gathered web page element information to identify patterns in layout independence correlated to web page element information; and
updating the classifier to predict sub-tree independence based on element information in the web page script and the identified patterns.

38. The computing device of claim 23, wherein the processor is configured with processor-executable instructions to perform operations further comprising:
processing a first set of web pages and gathering web page element information associated with the first set of web pages and performing machine learning analysis on the gathered web page element information to identify a first set of patterns;
using the first set of patterns associated with the predicted sub-tree independence of the first set of web pages to concurrently process portions to be rendered; and
continuously updating the first set of patterns in a dynamic manner by gathering additional web page element information and performing machine analysis to identify additional patterns to supplement the first set of patterns in a continuous manner.

39. The computing device of claim 38, wherein the processor is configured with processor-executable instructions to perform operations further comprising processing a second set of web pages and gathering web page element information to identify a second set of patterns and using the second set of patterns to update the first set of patterns.

40. The computing device of claim 23, wherein the processor is configured with processor-executable instructions to perform operations further comprising performing machine learning analysis on the gathered web page element information to identify patterns in layout independence correlated to web page element information in HTML coding.

41. The computing device of claim 40, wherein HTML coding includes a first sub-tree of the DOM tree that indicates a parallel processing capability, wherein HTML coding also includes a second sub-tree that is silent as to the parallel processing capability of the second sub-tree, and wherein the classifier predicts sub-tree independence of the second sub-tree of web page elements based on element information in the web page script.

42. A server, comprising:
a network interface interconnected to a communications network;
an internal memory; and
a processor coupled to the network interface and the internal memory, wherein the processor is configured with processor-executable instructions to perform operations comprising:
receiving web page element information from at least one computing device connected to the communications network, wherein the web page element information is gathered by the at least one computing device while processing a plurality of web pages;
performing machine learning analysis on the gathered web page element information to identify patterns in layout independence correlated to web page element information; and
transmitting information regarding identified patterns in layout independence correlated to web page element information to the at least one computing device in a format that enables the at least one computing device to train a classifier to predict sub-tree independence based on element information in a web page and use the predicted sub-tree independence to concurrently process portions of a web page to be rendered.

43. A communication system, comprising:
a plurality of computing devices coupled to a communication network; and
a server coupled to the communication network;
wherein the plurality of computing devices each comprise a processor configured to perform operations comprising:
processing a plurality of web pages and gathering web page element information; and
transmitting the gathered web page element information to the server,
wherein the server comprises a processor configured to perform operations comprising:
performing machine learning analysis on the gathered web page element information to identify patterns in layout independence correlated to web page element information; and transmitting information regarding identified patterns in layout independence correlated to web page element information to the plurality of computing devices,
  wherein the processor of each of the plurality of computing devices is further configured to perform operations comprising:
  receiving the information regarding identified patterns in layout independence correlated to web page element information from the server;
  using the information regarding identified patterns in layout independence correlated to web page element information to train a classifier to predict sub-tree independence based on element information in a web page; and
  using the predicted sub-tree independence to concurrently process portions of a webpage to be rendered.

44. The communication system of claim 43, wherein performing machine learning analysis on the gathered web page element information to identify patterns in layout independence correlated to web page element information comprises generating aggregated web page element information at the server.

45. The communication system of claim 43, wherein training a classifier to predict sub-tree independence based on element information in a web page script comprises training a classifier operating in the plurality of computing devices to predict sub-tree independence based on machine learning analysis performed on the received aggregated web page element information.

46. A non-transitory computer readable storage medium having stored thereon processor-executable instructions configured to cause a processor to perform operations comprising:
  processing a plurality of web pages and gathering web page element information;
  performing machine learning analysis on the gathered web page element information to identify patterns in layout independence correlated to web page element information;
  training a classifier to predict sub-tree independence based on element information in a web page; and
  using the predicted sub-tree independence to concurrently process portions of a web page to be rendered.

47. The non-transitory computer readable storage medium of claim 46, wherein the stored processor-executable instructions are configured to cause a processor to perform operations such that using the predicted sub-tree independence to concurrently process portions of a web page to be rendered comprises:
  predicting that a sub-tree is a priori independent based on the web page element information in the web page; and
  forming a task out of the a priori independent part of a DOM tree.

48. The non-transitory computer readable storage medium of claim 46, wherein the stored processor-executable instructions are configured to cause a processor to perform operations further comprising:
  predicting, based on the element information in the web page that a sub-tree would be conditionally independent if certain information is determined;
  performing a task to obtain the certain information; and
  performing a task out of the conditionally independent part of a DOM tree using the obtained certain information.

49. The non-transitory computer readable storage medium of claim 48, wherein the stored processor-executable instructions are configured to cause a processor to perform operations such that performing a task to obtain the certain information comprises promptly computing the certain information.

50. The non-transitory computer readable storage medium of claim 48, wherein the stored processor-executable instructions are configured to cause a processor to perform operations such that performing a task to obtain the certain information comprises determining the certain information based on speculation.

51. The non-transitory computer readable storage medium of claim 46, wherein the stored processor-executable instructions are configured to cause a processor to perform operations further comprising gathering web page element information that comprises at least one of web page element layout size, position, CSS style attributes, sub-tree size, HTML tag, parent HTML tag, and web page feature information.

52. The non-transitory computer readable storage medium of claim 46, wherein the stored processor-executable instructions are configured to cause a processor to perform operations further comprising using the predicted sub-tree independence to determine that a sub-tree of a DOM tree of the web page is not independent and that the sub-tree cannot be concurrently processed.

53. The non-transitory computer readable storage medium of claim 46, wherein the stored processor-executable instructions are configured to cause a processor to perform operations further comprising using a single web browser to perform the machine learning analysis and to predict sub-tree independence to concurrently process portions of the web page.

54. The non-transitory computer readable storage medium of claim 46, wherein the stored processor-executable instructions are configured to cause a processor to perform operations further comprising updating the classifier by processing a plurality of updated web pages and gathering updated web page element information, and performing machine learning analysis on the gathered web page element information to identify additional patterns in layout independence correlated to web page element information.

55. The non-transitory computer readable storage medium of claim 46, wherein the stored processor-executable instructions are configured to cause a processor to perform operations such that processing a plurality of web pages and gathering web page element information is accomplished in an instrumented browser operating on the computing device.

56. The non-transitory computer readable storage medium of claim 46, wherein the stored processor-executable instructions are configured to cause a processor to perform operations such that predicting sub-tree independence based on the element information in the web page script is performed by the classifier, wherein the classifier provides sub-tree independence data to a scheduling algorithm.

57. The non-transitory computer readable storage medium of claim 46, wherein the stored processor-executable instructions are configured to cause a processor to perform operations such that the scheduling algorithm uses the predicted sub-tree independence to concurrently process portions of the web page.

58. The non-transitory computer readable storage medium of claim 46, wherein the stored processor-executable instructions are configured to cause a processor to perform operations further comprising performing machine learning analysis on the gathered web page element information to identify patterns in layout independence correlated to presentation semantics in a predetermined style sheet language coding.

59. The non-transitory computer readable storage medium of claim 46, wherein the stored processor-executable instructions are configured to cause a processor to perform operations further comprising using the predicted sub-tree independence to render a first independent sub-tree of a DOM tree before rendering a second dependent sub-tree of the DOM tree.

60. The non-transitory computer readable storage medium of claim 46, wherein the stored processor-executable instructions are configured to cause a processor to perform operations further comprising:
   continuously processing a plurality of web pages from the Internet and gathering web page element information;
   continuously performing machine learning analysis on the gathered web page element information to identify patterns in layout independence correlated to web page element information; and
   updating the classifier to predict sub-tree independence based on element information in the web page script and the identified patterns.

61. The non-transitory computer readable storage medium of claim 46, wherein the stored processor-executable instructions are configured to cause a processor to perform operations further comprising:
   processing a first set of web pages and gathering web page element information associated with the first set of web pages and performing machine learning analysis on the gathered web page element information to identify a first set of patterns;
   using the first set of patterns associated with the predicted sub-tree independence of the first set of web pages to concurrently process portions to be rendered; and
   continuously updating the first set of patterns in a dynamic manner by gathering additional web page element information and performing machine analysis to identify additional patterns to supplement the first set of patterns in a continuous manner.

62. The non-transitory computer readable storage medium of claim 61, wherein the stored processor-executable instructions are configured to cause a processor to perform operations further comprising processing a second set of web pages and gathering web page element information to identify a second set of patterns and using the second set of patterns to update the first set of patterns.

63. The non-transitory computer readable storage medium of claim 46, wherein the stored processor-executable instructions are configured to cause a processor to perform operations further comprising performing machine learning analysis on the gathered web page element information to identify patterns in layout independence correlated to web page element information in HTML coding.

64. The non-transitory computer readable storage medium of claim 63, wherein the stored processor-executable instructions are configured to cause a processor to perform operations such that HTML coding includes a first sub-tree of the DOM tree that indicates a parallel processing capability, wherein HTML coding also includes a second sub-tree that is silent as to the parallel processing capability of the second sub-tree, and wherein the classifier predicts sub-tree independence of the second sub-tree of web page elements based on element information in the web page script.

65. A non-transitory computer readable storage medium having stored thereon processor-executable instructions configured to cause a processor server coupled to a network to perform operations comprising:
   receiving web page element information from a plurality of computing devices connected to the communications network, wherein the web page element information is gathered by the plurality of computing devices while processing a plurality of web pages;
   performing machine learning analysis on the gathered web page element information to identify patterns in layout independence correlated to web page element information; and
transmitting information regarding identified patterns in layout independence correlated to web page element information to at least one computing device in a format that enables the at least one computing device to train a classifier to predict sub-tree independence based on element information in a web page and use the predicted sub-tree independence to concurrently process portions of a web page to be rendered.

* * * * *